(12) United States Patent
Wang et al.

(10) Patent No.: US 11,057,149 B2
(45) Date of Patent: Jul. 6, 2021

(54) CODING SCHEME INDICATION METHOD AND DEVICE

(71) Applicant: Huawei Technologies Co., Ltd., Shenzhen (CN)

(72) Inventors: Jian Wang, Hangzhou (CN); Yunfei Qiao, Hangzhou (CN); Rong Li, Hangzhou (CN); Jun Wang, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/986,860

(22) Filed: Aug. 6, 2020

(65) Prior Publication Data

US 2020/0396020 A1 Dec. 17, 2020

Related U.S. Application Data

(63) Continuation of application No. PCT/CN2019/074507, filed on Feb. 1, 2019.

(30) Foreign Application Priority Data

Feb. 9, 2018 (CN) .......................... 201810134980.2

(51) Int. Cl.
*H04L 1/00* (2006.01)
(52) U.S. Cl.
CPC .......... *H04L 1/0026* (2013.01); *H04L 1/0016* (2013.01); *H04L 1/0057* (2013.01)
(58) Field of Classification Search
CPC .... H04L 1/0026; H04L 1/0016; H04L 1/0057
See application file for complete search history.

(56) References Cited

U.S. PATENT DOCUMENTS

2017/0026976 A1 1/2017 Yoo et al.
2017/0141895 A1* 5/2017 Tavildar .............. H04W 72/042
(Continued)

FOREIGN PATENT DOCUMENTS

CN 103905102 A 7/2014
CN 106549726 A 3/2017
(Continued)

OTHER PUBLICATIONS

Huwai et al., "Summary of code combination for eMBB data channel", 3GPP TSG RAN WG1 Meeting #87 R1-1611253, Reno, NV, USA, Nov. 14-18, 2016, 6 pages.
(Continued)

*Primary Examiner* — Nader Bolourchi
(74) *Attorney, Agent, or Firm* — Slater Matsil, LLP

(57) ABSTRACT

Embodiments of this application provide a coding scheme indication method and device. The method includes: obtaining, by a first device, a coding scheme indication, where the coding scheme indication is used to indicate a coding scheme of first data and/or a coding scheme of second data, the first data is data sent by the first device to a second device, the coding scheme of the first data is a polar coding scheme or a low-density parity-check LDPC coding scheme, the second data is data sent by the second device to the first device, and the coding scheme of the second data is a polar coding scheme or an LDPC coding scheme; and sending, by the first device, the coding scheme indication to the second device.

20 Claims, 12 Drawing Sheets

(56) References Cited

U.S. PATENT DOCUMENTS

| | | | | |
|---|---|---|---|---|
| 2017/0295607 A1* | 10/2017 | Prasad | ............... | H04B 17/336 |
| 2018/0109366 A1* | 4/2018 | Wu | ..................... | H04L 27/26 |
| 2018/0351625 A1* | 12/2018 | Xu | ..................... | H04W 4/70 |
| 2019/0260501 A1* | 8/2019 | Kim | ................... | H04L 1/0009 |

FOREIGN PATENT DOCUMENTS

| | | | |
|---|---|---|---|
| WO | 2017050273 A1 | 3/2017 | |
| WO | 2017122045 A1 | 7/2017 | |

OTHER PUBLICATIONS

3rd Generation Partnership Project; Technical Specification Group Services and System Aspects; Study on enhancement of 3GPP Support for 5G V2X Services (Release 15); 3GPP TR 22.886 V15.1.0 (Mar. 2017), 58 pages.

Huawei et al., "Channel coding for URLLC", 3GPP TSG RAN WG1 Meeting #91 R1-1720759, Reno, NV, USA, Nov. 27-Dec. 1, 2017, 16 pages.

Gallager, R.G., "Low Density Parity-Check Codes", IRE Transactions on Information Theory, Jan. 2016, 8 pages.

* cited by examiner

| Header | Carrier indicator | Bandwidth part indicator | Frequency domain resource location | Time domain resource location | MCS index | Coding scheme type | Redundancy version | New data indicator |
|---|---|---|---|---|---|---|---|---|

FIG. 10

CODING SCHEME INDICATION METHOD AND DEVICE

CROSS-REFERENCE TO RELATED APPLICATIONS

This application is a continuation of International Application No. PCT/CN2019/074507, filed on Feb. 1, 2019, which claims priority to Chinese Patent Application No. 201810134980.2, filed on Feb. 9, 2018. The disclosures of the aforementioned applications are hereby incorporated by reference in their entireties.

TECHNICAL FIELD

This application relates to the field of communications technologies, and in particular, to a coding scheme indication method and device.

BACKGROUND

A new radio (NR) access technology in the 5th generation mobile communication (5G) is currently receiving extensive attention and research in 3GPP and other international standardization organizations.

In a 5G mobile communications system, three typical scenarios are proposed. The three typical scenarios include enhanced mobile broadband (eMBB), massive machine type communication, and ultra-reliable low-latency communication (URLLC). Scenarios corresponding to the URLLC include unmanned driving, industrial control, and the like. The application scenarios raise stricter requirements for reliability and a latency. Specific requirements of the URLLC scenario include transmission reliability of 99.999% and a transmission latency less than 1 ms.

In the 5G mobile communications system, a new coding scheme is provided. However, a method for aligning channel coding schemes at a receive end and a transmit end in the URLLC scenario is not provided. Therefore, currently, the method for aligning channel coding schemes at a receive end and a transmit end in the URLLC scenario needs to be provided urgently.

SUMMARY

Embodiments of this application provide a coding scheme indication method and device, to provide a method for aligning channel coding schemes at a receive end and a transmit end.

According to a first aspect, an embodiment of this application provides a coding scheme indication method, including: obtaining, by a first device, a coding scheme indication, where the coding scheme indication is used to indicate a coding scheme of first data and/or a coding scheme of second data, the first data is data sent by the first device to a second device, the coding scheme of the first data is a polar coding scheme or a low-density parity-check LDPC coding scheme, the second data is data sent by the second device to the first device, the coding scheme of the second data is a polar coding scheme or an LDPC coding scheme, and the coding scheme indication may be dynamic or semi-static, and may be explicit or implicit; and sending, by the first device, the coding scheme indication to the second device, where the first device and the second device may be any device having a communication function, for example, a network device and a terminal device.

In a possible design, the obtaining, by a first device, a coding scheme indication includes: obtaining, by the first device based on a mapping relationship between a pilot sequence group and a coding scheme, a first pilot sequence corresponding to the coding scheme of the first data, where a pilot sequence group to which the first pilot sequence belongs is used to indicate the coding scheme of the first data; and the sending, by the first device, the coding scheme indication to the second device includes: sending, by the first device, the first pilot sequence to the second device.

In a possible design, the obtaining, by a first device, a coding scheme indication includes: obtaining, by the first device based on a mapping relationship between a physical resource location to which a pilot sequence is mapped and a coding scheme, a physical resource location to which a second pilot sequence corresponding to the coding scheme of the first data is mapped, where the physical resource location to which the second pilot sequence is mapped is used to indicate the coding scheme of the first data; and the sending, by the first device, the coding scheme indication to the second device includes: sending, by the first device, the second pilot sequence to the second device on a physical resource corresponding to the physical resource location.

In a possible design, if the physical resource location to which the second pilot sequence is mapped is an even-numbered bit in frequency domain, the coding scheme indication is used to indicate the LDPC coding scheme; or if the physical resource location to which the second pilot sequence is mapped is an odd-numbered bit in frequency domain, the coding scheme indication is used to indicate the polar coding scheme; or if the physical resource location to which the second pilot sequence is mapped is an even-numbered bit in frequency domain, the coding scheme indication is used to indicate the polar coding scheme; or if the physical resource location to which the second pilot sequence is mapped is an odd-numbered bit in frequency domain, the coding scheme indication is used to indicate the LDPC coding scheme.

In a possible design, the obtaining, by a first device, a coding scheme indication includes: obtaining, by the first device, a first index, where there is a mapping relationship between the first index and a coding scheme, and the first index is used to indicate the coding scheme of the first data; and the sending, by the first device, the coding scheme indication to the second device includes: sending, by the first device, the first index to the second device.

In a possible design, before the obtaining, by a first device, a coding scheme indication, the method further includes: determining, by the first device, the coding scheme of the first data based on at least one of channel quality, a service type of the first data, and a capability of the first device.

In a possible design, the obtaining, by a first device, a coding scheme indication includes: generating, by the first device, information, where the information is used to indicate the coding scheme of the first data and/or the coding scheme of the second data; and the sending, by the first device, the coding scheme indication to the second device includes: sending, by the first device, the information to the second device.

In a possible design, the information includes a first channel configuration field and/or a second channel configuration field; a coding scheme type field in the first channel configuration field is used to indicate the coding scheme of the first data; and a coding scheme type field in the second channel configuration field is used to indicate the coding scheme of the second data.

In a possible design, when the information is used to schedule the first data, a coding scheme type field in the information is used to indicate the coding scheme of the first data; or when the information is used to schedule the second data, a coding scheme type field in the information is used to indicate the coding scheme of the second data.

In a possible design, the generating, by the first device, information includes: obtaining, by the first device, a second index, where there is a mapping relationship between the second index and a coding scheme; and generating, by the first device, the information based on the second index, where the information includes the second index, and the second index is used to indicate the coding scheme of the first data or the coding scheme of the second data.

In a possible design, when the information is used to schedule the first data, the second index in the information is used to indicate the coding scheme of the first data; or when the information is used to schedule the second data, the second index in the information is used to indicate the coding scheme of the second data.

In a possible design, before the generating, by the first device, first information, the method further includes: receiving, by the first device, a third index sent by the second device, and obtaining, based on a mapping relationship between the third index and a coding scheme, a coding scheme of the first data that is indicated by the third index; and the obtaining, by a first device, a coding scheme indication includes: if the coding scheme of the first data that is indicated by the third index is consistent with a coding scheme of the first data that is determined by the first device, generating, by the first device, the coding scheme indication based on the coding scheme of the first data that is indicated by the third index; or if the coding scheme of the first data that is indicated by the third index is inconsistent with a coding scheme of the first data that is determined by the first device, generating, by the first device, the coding scheme indication based on the coding scheme of the first data that is determined by the first device.

In a possible design, before the obtaining, by a first device, a coding scheme indication, the method further includes: determining, by the first device, the coding scheme of the first data based on at least one of channel quality, a service type of the first data, and a capability of the second device; and/or determining, by the first device, the coding scheme of the second data based on at least one of channel quality, a service type of the second data, and a capability of the second device.

According to a second aspect, an embodiment of this application provides a coding scheme indication method, including: receiving, by a second device, a coding scheme indication sent by a first device, where the coding scheme indication is used to indicate a coding scheme of first data and/or a coding scheme of second data, the first data is data sent by the first device to the second device, the coding scheme of the first data is a polar coding scheme or a low-density parity-check LDPC coding scheme, the second data is data sent by the second device to the first device, and the coding scheme of the second data is a polar coding scheme or an LDPC coding scheme; and determining, by the second device, the coding scheme of the first data and/or the coding scheme of the second data based on the coding scheme indication.

In a possible design, the receiving, by a second device, a coding scheme indication sent by a first device includes: receiving, by the second device, a first pilot sequence sent by the first device, where a pilot sequence group to which the first pilot sequence belongs is used to indicate the coding scheme of the first data; and the determining, by the second device, the coding scheme of the first data based on the coding scheme indication includes: determining, by the second device, the pilot sequence group to which the first pilot sequence belongs; and determining, by the second device based on a mapping relationship between a pilot sequence group and a coding scheme, the coding scheme of the first data that is indicated by the pilot sequence group to which the first pilot sequence belongs.

In a possible design, the receiving, by a second device, a coding scheme indication sent by a first device includes: receiving, by the second device, a second pilot sequence sent by the first device on a physical resource, where a physical resource location to which the second pilot sequence is mapped is used to indicate the coding scheme of the first data; and the determining, by the second device, the coding scheme of the first data based on the coding scheme indication includes: determining, by the second device based on a mapping relationship between a physical resource location to which a pilot sequence is mapped and a coding scheme, the coding scheme of the first data that is indicated by the physical resource location to which the second pilot sequence is mapped.

In a possible design, if the physical resource location to which the second pilot sequence is mapped is an even-numbered bit in frequency domain, the coding scheme indication is used to indicate the LDPC coding scheme; or if the physical resource location to which the second pilot sequence is mapped is an odd-numbered bit in frequency domain, the coding scheme indication is used to indicate the polar coding scheme; or if the physical resource location to which the second pilot sequence is mapped is an even-numbered bit in frequency domain, the coding scheme indication is used to indicate the polar coding scheme; or if the physical resource location to which the second pilot sequence is mapped is an odd-numbered bit in frequency domain, the coding scheme indication is used to indicate the LDPC coding scheme.

In a possible design, the receiving, by a second device, a coding scheme indication sent by a first device includes: receiving, by the second device, a first index sent by the first device, where there is a mapping relationship between the first index and a coding scheme, and the first index is used to indicate the coding scheme of the first data; and the determining, by the second device, the coding scheme of the first data based on the coding scheme indication includes: obtaining, by the second device based on the mapping relationship between the first index and a coding scheme, the coding scheme of the first data that is indicated by the first index.

In a possible design, the receiving, by a second device, a coding scheme indication sent by a first device includes: receiving, by the second device, information sent by the first device, where the information is used to indicate the coding scheme of the first data and/or the coding scheme of the second data; and the determining, by the second device, the coding scheme of the first data and/or the coding scheme of the second data based on the coding scheme indication includes: determining, by the second device, the coding scheme of the first data and/or the coding scheme of the second data based on the information.

In a possible design, the information includes a first channel configuration field and/or a second channel configuration field; a coding scheme type field in the first channel configuration field is used to indicate the coding scheme of the first data; and/or a coding scheme type field in the second channel configuration field is used to indicate the coding scheme of the second data.

In a possible design, when the information is used to schedule the first data, a coding scheme type field in the information is used to indicate the coding scheme of the first data; or when the information is used to schedule the second data, a coding scheme type field in the information is used to indicate the coding scheme of the second data.

In a possible design, the information includes a second index, and the second index is used to indicate the coding scheme of the first data or the coding scheme of the second data; and the determining, by the second device, the coding scheme of the first data and/or the coding scheme of the second data based on the information includes: obtaining, by the second device, the second index, and obtaining, based on a mapping relationship between the second index and a coding scheme, the coding scheme of the first data that is indicated by the second index or the coding scheme that is of the second data and that is indicated by the second index.

In a possible design, when the information is used to schedule the first data, the second index in the information is used to indicate the coding scheme of the first data; or when the information is used to schedule the second data, the second index in the information is used to indicate the coding scheme of the second data.

According to a third aspect, an embodiment of this application provides a coding scheme indication device, where the device is a first device, and the device includes: a processing module, configured to obtain a coding scheme indication, where the coding scheme indication is used to indicate a coding scheme of first data and/or a coding scheme of second data, the first data is data sent by the first device to a second device, the coding scheme of the first data is a polar coding scheme or a low-density parity-check LDPC coding scheme, the second data is data sent by the second device to the first device, and the coding scheme of the second data is a polar coding scheme or an LDPC coding scheme; and a sending module, configured to send the coding scheme indication to the second device.

In a possible design, the processing module is specifically configured to obtain, based on a mapping relationship between a pilot sequence group and a coding scheme, a first pilot sequence corresponding to the coding scheme of the first data, where a pilot sequence group to which the first pilot sequence belongs is used to indicate the coding scheme of the first data.

The sending module is specifically configured to send the first pilot sequence to the second device.

In a possible design, the processing module is specifically configured to obtain, based on a mapping relationship between a physical resource location to which a pilot sequence is mapped and a coding scheme, a physical resource location to which a second pilot sequence corresponding to the coding scheme of the first data is mapped, where the physical resource location to which the second pilot sequence is mapped is used to indicate the coding scheme of the first data.

The sending module is specifically configured to send the second pilot sequence to the second device on a physical resource corresponding to the physical resource location.

In a possible design, the processing module is specifically configured to obtain a first index, where there is a mapping relationship between the first index and a coding scheme, and the first index is used to indicate the coding scheme of the first data.

The sending module is specifically configured to send the first index to the second device.

In a possible design, the processing module is further configured to: before obtaining the coding scheme indication, determine the coding scheme of the first data based on at least one of channel quality, a service type of the first data, and a capability of the first device.

In a possible design, the processing module is specifically configured to generate information, where the information is used to indicate the coding scheme of the first data and/or the coding scheme of the second data.

The sending module is specifically configured to send the information to the second device.

In a possible design, the processing module is specifically configured to: obtain a second index, where there is a mapping relationship between the second index and a coding scheme; and generate the information based on the second index, where the information includes the second index, and the second index is used to indicate the coding scheme of the first data or the coding scheme of the second data.

In a possible design, the processing module is further configured to: before the first device generates the first information, obtain, based on a mapping relationship between a received third index sent by the second device and a coding scheme, a coding scheme of the first data that is indicated by the third index.

The processing module is specifically configured to: if the coding scheme of the first data that is indicated by the third index is consistent with a coding scheme of the first data that is determined by the first device, generate the coding scheme indication based on the coding scheme of the first data that is indicated by the third index; or if the coding scheme of the first data that is indicated by the third index is inconsistent with a coding scheme of the first data that is determined by the first device, generate the coding scheme indication based on the coding scheme of the first data that is determined by the first device.

In a possible design, the processing module is further configured to: before the first device obtains the coding scheme indication, determine the coding scheme of the first data based on at least one of channel quality, a service type of the first data, and a capability of the second device; and/or determine the coding scheme of the second data based on at least one of channel quality, a service type of the second data, and a capability of the second device.

According to a fourth aspect, an embodiment of this application provides a coding scheme determining device, where the device is a second device, and the device includes: a receiving module, configured to receive a coding scheme indication sent by a first device, where the coding scheme indication is used to indicate a coding scheme of first data and/or a coding scheme of second data, the first data is data sent by the first device to the second device, the coding scheme of the first data is a polar coding scheme or a low-density parity-check LDPC coding scheme, the second data is data sent by the second device to the first device, and the coding scheme of the second data is a polar coding scheme or an LDPC coding scheme; and a processing module, configured to determine the coding scheme of the first data and/or the coding scheme of the second data based on the coding scheme indication.

In a possible design, the receiving module is specifically configured to receive a first pilot sequence sent by the first device, where a pilot sequence group to which the first pilot sequence belongs is used to indicate the coding scheme of the first data.

The processing module is specifically configured to: determine the pilot sequence group to which the first pilot sequence belongs, and determine, based on a mapping relationship between a pilot sequence group and a coding scheme, the coding scheme of the first data that is indicated by the pilot sequence group to which the first pilot sequence belongs.

In a possible design, the receiving module is specifically configured to receive a second pilot sequence sent by the first device on a physical resource, where a physical resource location to which the second pilot sequence is mapped is used to indicate the coding scheme of the first data.

The processing module is specifically configured to determine, based on a mapping relationship between a physical resource location to which a pilot sequence is mapped and a coding scheme, the coding scheme of the first data that is indicated by the physical resource location to which the second pilot sequence is mapped.

In a possible design, the receiving module is specifically configured to receive a first index sent by the first device, where there is a mapping relationship between the first index and a coding scheme, and the first index is used to indicate the coding scheme of the first data.

The processing module is specifically configured to obtain, based on the mapping relationship between the first index and a coding scheme, the coding scheme of the first data that is indicated by the first index.

In a possible design, the receiving module is specifically configured to receive information sent by the first device, where the information is used to indicate the coding scheme of the first data and/or used to indicate the coding scheme of the second data.

The processing module is specifically configured to determine the coding scheme of the first data and/or the coding scheme of the second data based on the information.

According to a fifth aspect, an embodiment of this application provides a device, including a memory, a processor, and a computer program. The computer program is stored in the memory, and the processor runs the computer program to perform the coding scheme indication method according to the first aspect and the possible implementations of the first aspect.

According to a sixth aspect, an embodiment of this application provides a storage medium, where the storage medium includes a computer program. The computer program is used to implement the coding scheme indication method according to the first aspect and the possible implementations of the first aspect.

According to a seventh aspect, an embodiment of this application provides a device, including a memory, a processor, and a computer program. The computer program is stored in the memory, and the processor runs the computer program to perform the coding scheme indication method according to the second aspect and the possible implementations of the second aspect.

According to an eighth aspect, an embodiment of this application provides a storage medium, where the storage medium includes a computer program. The computer program is used to implement the coding scheme indication method according to the second aspect and the possible implementations of the second aspect.

According to a ninth aspect, an embodiment of this application provides a computer program product, where the computer program product includes computer program code. When the computer program code is run on a computer, the computer is enabled to perform the coding scheme indication method according to the first aspect and the possible implementations of the first aspect.

According to a tenth aspect, an embodiment of this application provides a chip, including a memory and a processor. The memory is configured to store a computer program, and the processor is configured to invoke the computer program from the memory and run the computer program, so that a communications device on which the chip is installed performs the coding scheme indication method according to the first aspect and the possible implementations of the first aspect.

According to an eleventh aspect, an embodiment of this application provides a computer program product, where the computer program product includes computer program code. When the computer program code is run on a computer, the computer is enabled to perform the coding scheme indication method according to the second aspect and the possible implementations of the second aspect.

According to a twelfth aspect, an embodiment of this application provides a chip, including a memory and a processor. The memory is configured to store a computer program, and the processor is configured to invoke the computer program from the memory and run the computer program, so that a communications device on which the chip is installed performs the coding scheme indication method according to the second aspect and the possible implementations of the second aspect.

According to the coding scheme indication provided in the embodiments of this application, the first device obtains the coding scheme indication, where the coding scheme indication is used to indicate the coding scheme of the first data and/or the coding scheme of the second data. The first data is the data sent by the first device to the second device, the second data is the data sent by the second device to the first device, and the first device sends the coding scheme indication to the second device. In this way, the second device aligns coding schemes with the first device at a receive end and a transmit end. Therefore, in various hybrid coding cases, the receive end can learn of a coding scheme of data sent by the transmit end, to perform decoding by using a correct decoding scheme.

BRIEF DESCRIPTION OF THE DRAWINGS

FIG. 10 is a schematic structural diagram of DCI according to an embodiment of this application;

DETAILED DESCRIPTION OF ILLUSTRATIVE EMBODIMENTS

Embodiments of this application may be applied to a wireless communications system. It should be noted that the wireless communications system mentioned in the embodiments of this application includes but is not limited to: a narrowband internet of things (NB-IoT) system, a global system for mobile communications (GSM), an enhanced data rates for GSM evolution (EDGE) system, a wideband code division multiple access (WCDMA) system, a code division multiple access (CDMA2000) 2000 system, a time division-synchronous code division multiple access (TD-SCDMA) system, a long term evolution (LTE) system, and a next-generation 5G mobile communications system.

Figure 1A:
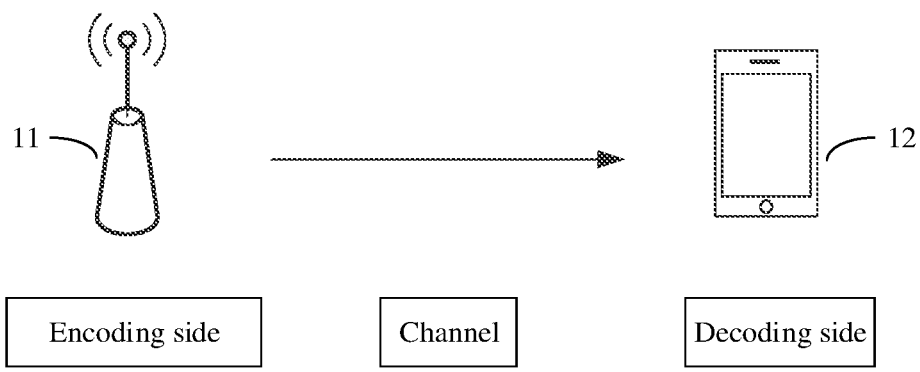
FIG. 1A is a schematic architectural diagram of an encoding/decoding system according to an embodiment of this application.
Figure 1B:
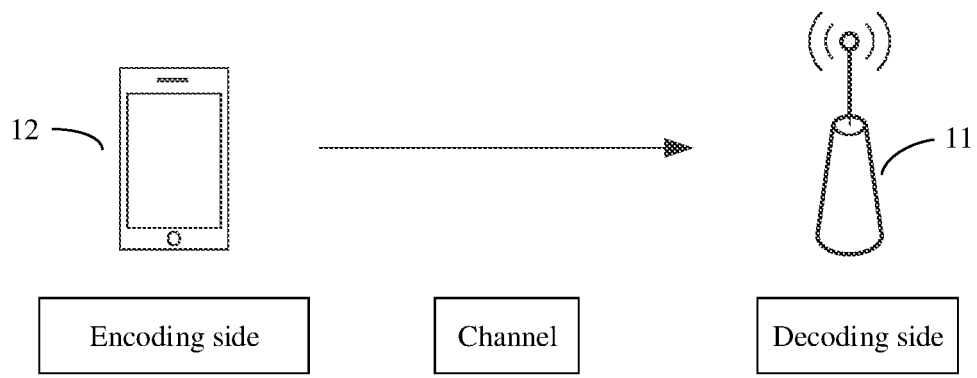
FIG. 1B is a schematic architectural diagram of an encoding/decoding system according to another embodiment of this application.

The communications system in the embodiments of this application may include an encoder side and a decoder side. FIG. 1A is a schematic architectural diagram of an encoding/decoding system according to an embodiment of this application. FIG. 1B is a schematic architectural diagram of an encoding/decoding system according to another embodiment of this application. As shown in FIG. 1A and FIG. 1B, the encoder side encodes to-be-sent data, outputs an encoded sequence, and transmits the encoded sequence to the decoder side through a channel. The decoder side may receive a to-be-decoded sequence (that is, the encoded sequence) sent by the encoder side, and decode the to-be-decoded sequence.

Specifically, any device having an encoding function may be used as the encoder side in the embodiments of this application, and any device having a decoding function may be used as the decoder side in the embodiments of this application. In some possible implementations, if a device has both an encoding function and a decoding function, the device may be used as both the encoder side and the decoder side.

In a specific example, the device may be a network device or a terminal device. As shown in FIG. 1A, a network device 11 is used as an encoder side to send data to a terminal device 12 used as a decoder side. As shown in FIG. 1B, the terminal device 12 is used as an encoder side to send data to the network device 11 used as a decoder side.

In the embodiments of this application, the terminal device includes but is not limited to a mobile station (MS), a mobile terminal, a mobile telephone, a mobile phone, portable equipment, and the like. The terminal device may communicate with one or more core networks through a radio access network (RAN). For example, the terminal device may be a mobile phone (or referred to as a "cellular" phone) or a computer with a wireless communication function. Alternatively, the terminal device may be a computer with a wireless transceiver function, a virtual reality (VR) terminal device, an augmented reality (AR) terminal device, a wireless terminal related to industrial control, a wireless terminal related to unmanned driving (self driving), a wireless terminal related to remote medical, a wireless terminal related to a smart grid, a wireless terminal related to transportation safety, a wireless terminal related to a smart city, a wireless terminal related to a smart home, or the like. The terminal may have different names in different networks, such as user equipment, a mobile station, a subscriber unit, a station, a cellular phone, a personal digital assistant, a wireless modem, a wireless communications device, a handheld device, a laptop computer, a cordless phone, and a wireless local loop station. For ease of description, the names are briefly referred to as the terminal device in this application.

The network device may be a device configured to communicate with the terminal device, for example, may be a base transceiver station (BTS) in a GSM system or a CDMA system, or a NodeB (NB) in a WCDMA system, or an evolved NodeB (Evolutional NodeB, eNB or eNodeB) in an LTE system, or a transmission reception point (TRP) in a new radio (NR) network, or a next generation NodeB (gNB). Alternatively, the network device may be a relay station, an access point, a vehicle-mounted device, a wearable device, a network side device or a base station in a future 5G network, a network device in a future evolved public land mobile network (PLMN), a network device in a network in which a plurality of other technologies are integrated, or the like.

Currently, coding schemes used in a 5G mobile communications system are mainly a polar code coding scheme and a low-density parity-check (LDPC) coding scheme. Optionally, the coding scheme may be referred to as a coding scheme.

In this embodiment, the polar code herein includes but is not limited to Arikan polar code, PC-polar code, CA-polar code, and PC-CA polar code. The Arikan polar code refers to original polar code, is not cascaded with another piece of code, and only includes an information bit and a frozen bit. The PC-polar code is polar code cascaded with parity check (PC). The CA-polar is polar code cascaded with cyclic redundancy check (CRC) and another piece of cascaded polar code. The PC-CA polar code is polar code cascaded with both PC and CRC. The PC-polar code and the CA-polar code are cascaded to different pieces of code, to improve performance of the polar code.

The polar code is a linear block code, a generator matrix of the polar code is $G_N$, and a coding process is $u^N G_N = x^N$, where $u^N = (u_1, u_2, \ldots, u_N)$ is a binary row vector, and N is a length (that is, a mother code length), $G_N$ is a N×N matrix, $G_N = F_2^{\otimes (\log_2(N))}$, a matrix $$F_2 = \begin{bmatrix} 1 & 0 \\ 1 & 1 \end{bmatrix},$$

and $F_2^{\otimes (\log_2(N))}$ is defined as a Kronecker (Kronecker) product of $\log_2 N$ matrices $F_2$. The addition and multiplication operations mentioned above are all addition and multiplication operations in a binary Galois field.

In the polar code coding process, some bits in $u^N$ are used to carry information and are referred to as information bits, and a set of indexes of these bits is denoted by A; and some other bits are set to fixed values that are pre-agreed on by a receive end and a transmit end and are referred to as fixed bits, and a set of indexes of the fixed bits is denoted by a complementary set $A^c$ of A. Without loss of generality, the fixed bits are generally set to o. However, if pre-agreed between the receive end and the transmit end, a fixed bit sequence may be set randomly.

The polar code is decoded based on a successive cancellation (SC) decoding algorithm, a successive cancellation list (SCL) decoding algorithm, or the like. The polar code decoding algorithm is not particularly limited in this embodiment. The SC decoding algorithm is sequential decoding starting from a first bit. The successive cancellation list (SC List, SCL) decoding algorithm is an improved SC decoding algorithm. A plurality of candidate decoding results are reserved for each bit. After all bits are decoded, all decoding results in lists are screened according to a specific rule, to obtain a final decoding result. According to the rule, path penalty values of the lists may be sorted, and a list with a smallest path penalty value is selected. Alternatively, a list passing the CRC check may be used as a final output.

Low-density parity-check (LDPC) code is linear block code with a sparse check matrix proposed by Dr. Robert G. Gallager in 1963, and has relatively good performance close to a Shannon limit, a relatively low decoding complexity, and a flexible structure. The LDPC code is essentially the linear block code, and maps an information sequence to a sending sequence, in other words, a codeword sequence, by using a generator matrix G. For the generator matrix G, there is a completely equivalent parity check matrix H, and all codeword sequences C form null space of H.

Currently, LDPC code coding schemes mainly include: coding based on binary LDPC code, coding based on Gaussian cancellation, coding based on an approximate lower triangular matrix, coding based on cyclic code, and the like. Specific implementation of the LDPC code coding schemes is not particularly limited in this embodiment.

In a specific example, a check matrix corresponding to quasi-cyclic low-density parity-check (QC-LDPC) code constructed based on a base graph has advantages such as simple description and easy construction. The check matrix of the QC-LDPC is obtained by extending the base graph, and the check matrix of the QC-LDPC is characterized by simple description, easy construction, and the like. In 3GPP TS38.212.V15.0.0 (2017-12), two different base graphs (base graph, BG): a BG 1 and a BG 2 of the LDPC, are introduced for LDPC coding. For details, refer to the document 3GPP TS38.212.V15.0.0 (2017-12).

For example, the matrix H is a check matrix, and details are as follows:

$$H = \begin{bmatrix} Pa_{11} & Pa_{12} & \cdots & Pa_{1n_b} \\ Pa_{21} & Pa_{22} & \cdots & Pa_{2n_b} \\ \vdots & \vdots & \ddots & \vdots \\ Pa_{m_b1} & Pa_{m_b2} & \cdots & Pa_{m_bn_b} \end{bmatrix}$$

Herein, $a_{ij}$ is a shift factor of a cyclic shift matrix, $n_b$ and $m_b$ are respectively a quantity of columns and a quantity of rows of a base matrix, $Pa_{ij}$ is a cyclic shift matrix and may be obtained by performing cyclic shift $a_{ij}$ on a unit matrix I, where a range of $a_{ij}$ is $-1 \leq a_{ij} < Z$. An $Z \times Z$ all-zero matrix O is defined as $P^{-1}$. If H is a full rank matrix, $(N_b - m_b)Z$ information bits may be placed in a column $(n_b - m_b)$ on the base graph. The base graph column $K_b = (n_b - m_b)$ is referred to as an information column. When the QC-LDPC code is used, if a length K of an information sequence is divisible by $K_b$, each information bit location in an extended LDPC check matrix is used to place an information bit; or if K is not divisible by $K_b$, $Z \times K_b > K$, and there are $(Z \times K_b - K)$ redundant information bit locations in the extended LDPC check matrix, which may be referred to as padding bits.

Common LDPC decoding algorithms are based on message passing algorithms. One type of relatively complex belief propagation (BP) algorithm is usually used for simulation analysis and cannot be used in an actual system. Another type of min-sum (MS) algorithm is relatively simple and easy to be implemented. This type of algorithm includes a layered normalized min-sum (LNMS) algorithm and a layered offset min-sum (LOMS) algorithm, and the like.

In some possible implementations, performance of the polar code is relatively good when a code rate is relatively low and a data packet size is relatively small, and performance of the LDPC is relatively good when a code rate is relatively high and a data packet size is relatively large. However, in an ultra-reliable low-latency communication (URLLC) scenario in 5G, to meet different requirements of a plurality of service scenarios in the URLLC scenario, a hybrid channel coding scheme may be used on a URLLC data channel. Whether a polar coding scheme or an LDPC coding scheme is used as a channel coding scheme is determined based on different specific scenarios and parameters.

The encoder side performs encoding, and the decoder side performs decoding. Different encoding schemes correspond to different decoding schemes. Therefore, the decoder side needs to know an encoding scheme on the encoder side, to use a decoding scheme corresponding to the encoding scheme to perform correct decoding. Therefore, it is particularly important to align coding schemes on the encoder side and the decoder side. An embodiment of this application provides an implementation for aligning coding schemes on an encoder side and a decoder side.

Figure 2:
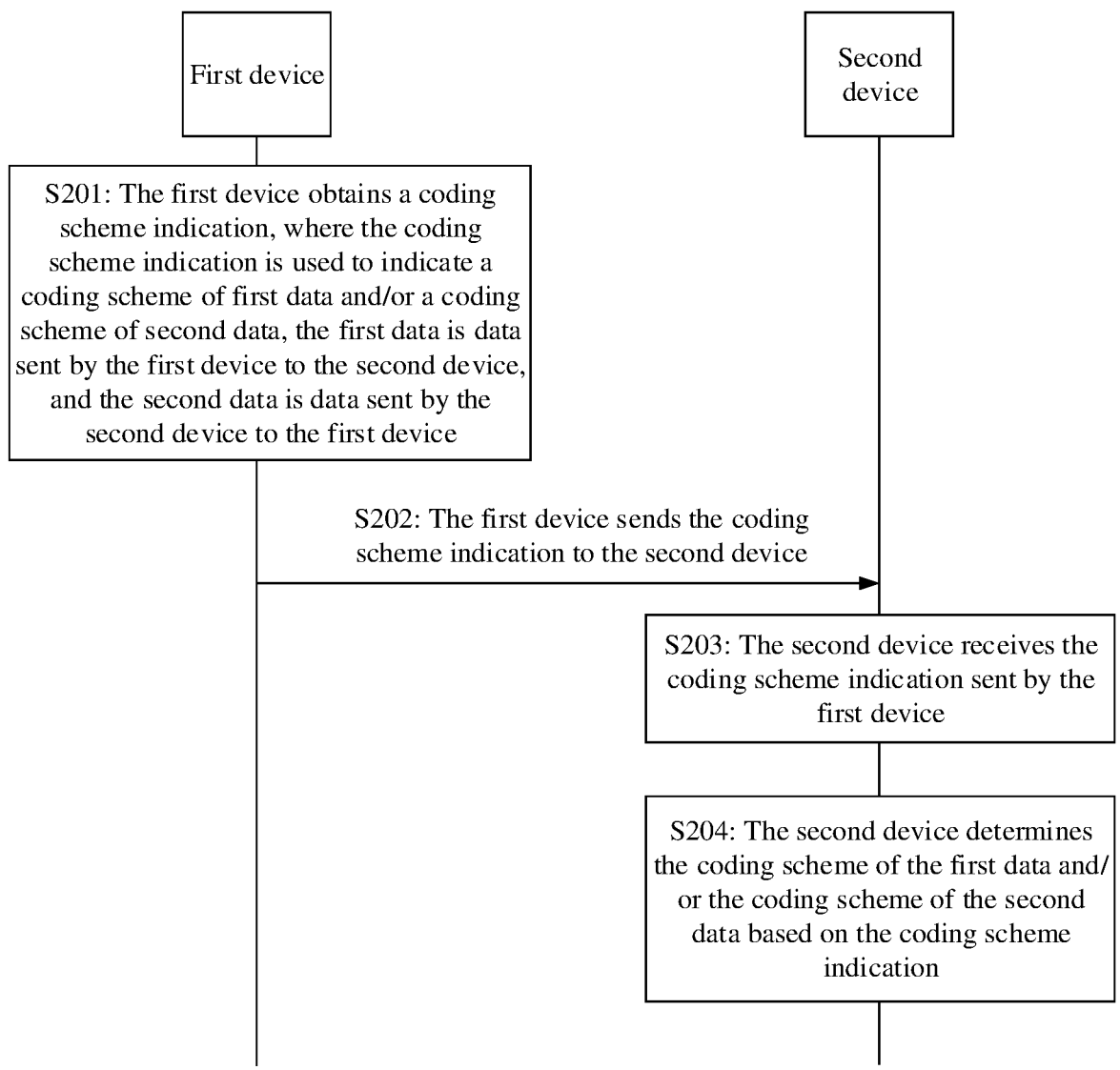
FIG. 2 is a signaling flowchart of a coding scheme indication method according to an embodiment of this application.

FIG. 2 is a signaling flowchart of a coding scheme indication method according to an embodiment of this application. As shown in FIG. 2, the method includes the following steps:

S201: A first device obtains a coding scheme indication, where the coding scheme indication is used to indicate a coding scheme of first data and/or a coding scheme of second data.

The first data is data sent by the first device to a second device, the coding scheme of the first data is a polar coding scheme or a low-density parity-check LDPC coding scheme, the second data is data sent by the second device to the first device, and the coding scheme of the second data is a polar coding scheme or an LDPC coding scheme.

S202: The first device sends the coding scheme indication to the second device.

S203: The second device receives the coding scheme indication sent by the first device.

S204: The second device determines the coding scheme of the first data and/or the coding scheme of the second data based on the coding scheme indication.

The first device and the second device in this embodiment may be any device having a communication function, for example, a terminal device or a network device. The first device may communicate with the second device. A communication mode between the first device and the second device may be unidirectional or bidirectional. The communication mode between the first device and the second device is not particularly limited in this embodiment.

In a possible implementation, when the first device may send the first data to the second device, the second device receives the first data sent by the first device. In this case, the first device is an encoder side, and the second device is a decoder side. The first device sends the coding scheme indication to the second device. The coding scheme indication may indicate the coding scheme of the first data, and the second device may determine the coding scheme of the first data based on the coding scheme indication. After the first device sends the first data to the second device, the second device decodes the first data by using a corresponding decoding scheme.

In another possible implementation, the second device may send the second data to the first device. In this case, the first device is a decoder side, and the second device is an encoder side. The first device sends the coding scheme indication to the second device, where the coding scheme indication may indicate the coding scheme of the second data. The second device determines the coding scheme of the second data based on the coding scheme indication, then, encodes the second data based on the coding scheme of the second data, and sends encoded second data to the first device. The first device decodes the second data by using a corresponding decoding scheme.

In still another possible implementation, the first device may send the first data to the second device, and the second device may further send the second data to the first device. The first device sends the coding scheme indication to the second device, where the coding scheme indication may indicate both the coding scheme of the first data and the coding scheme of the second data. For an implementation in which the first device sends the first data and the second device sends the second data, refer to the foregoing two possible implementations. Details are not described herein in this embodiment.

In various possible implementations, the coding scheme indication may be dynamic. To be specific, when the first device sends the first data and/or the second data each time, the first device may send a coding scheme indication to the second device. Alternatively, the coding scheme indication may be semi-static. To be specific, after the first device sends a coding scheme indication to the second device, the indication is valid within a period of time, and is always used when no new coding scheme indication is sent.

The coding scheme indication may explicitly or implicitly indicate the coding scheme of the first data and/or the coding scheme of the second data. For an explicit indication, the first device may directly send the indication to the second device, or may send information or signaling to the second device. The information or the signaling may be equivalent to the coding scheme indication, and is used to indicate the coding scheme or the like. The explicit indication manner of the coding scheme indication is not particularly limited in this embodiment.

For an implicit indication, the first device sends information, signaling, an index, a sequence, or the like to the second device. The information, the signaling, the index, the sequence, or the like may have a mapping relationship with the coding scheme indication, and may be equivalent to the coding scheme indication. The second device may obtain the coding scheme of the first data and/or the coding scheme of the second data based on the mapping relationship when receiving corresponding information, corresponding signaling, a corresponding index, or the like. In this embodiment, any content sent by the first device to the second device may implicitly indicate the coding scheme of the first data and/or the coding scheme of the second data. The implicit indication manner is not particularly limited in this embodiment.

A person skilled in the art may understand that decoding on a decoder side can be ensured only when a decoding scheme corresponds to a coding scheme. Therefore, the coding scheme indication may also be understood as an encoding/decoding scheme indication, that is, indicating both an encoding scheme and a decoding scheme. In this case, it may be described as that the first device sends the encoding/decoding scheme indication to the second device, where the encoding/decoding scheme indication is used to indicate an encoding/decoding scheme of the first data and an encoding/decoding scheme of the second data.

In this embodiment, the coding scheme of the first data may be a polar coding scheme or an LDPC coding scheme. The coding scheme of the second data may be a polar coding scheme or an LDPC coding scheme. For a specific implementation of the polar coding scheme or the LDPC coding scheme, refer to the foregoing embodiment. Details are not described herein in this embodiment. The coding scheme of the first data may alternatively be another coding scheme, and the coding scheme of the second data may alternatively be another coding scheme, for example, a turbo code coding scheme.

According to the coding scheme indication provided in this embodiment of this application, the first device obtains the coding scheme indication, where the coding scheme indication is used to indicate the coding scheme of the first data and/or the coding scheme of the second data. The first data is the data sent by the first device to the second device, the second data is the data sent by the second device to the first device, and the first device sends the coding scheme indication to the second device. In this way, the second device aligns coding schemes with the first device at a receive end and a transmit end. Therefore, in various hybrid coding cases, the receive end can learn of a coding scheme of data sent by the transmit end, to perform decoding by using a correct decoding scheme.

It can be learned from the description of the foregoing embodiment that the first device and the second device may be devices having a communication function. The following embodiments provide some possible scenarios to describe specific examples of the first device and the second device in detail. A person skilled in the art may understand that the following embodiments are not only applicable to the scenarios listed in the embodiments, but also applicable to other scenarios. Various possible scenarios are not particularly limited in the embodiments, and fall within the protection scope of this application provided that an implementation method is similar to that in the embodiments.

In a possible implementation, the embodiments may be applied to a scheduling-free system. The first device may be a terminal device, the second device may be a network device, and the first data may be uplink data sent by the first device to the second device.

In the scheduling-free system, the network device pre-allocates a plurality of transmission resources and notifies the terminal device of the plurality of transmission resources. When the terminal device needs to transmit uplink data, the terminal device selects at least one transmission resource from the plurality of transmission resources pre-allocated by the network device, and sends the uplink data by using the selected transmission resource. The network device detects, on one or more of the plurality of pre-allocated transmission resources, the uplink data sent by the terminal device. The detection may be blind detection, or detection performed based on a control domain in the uplink data, or detection performed in another manner.

Alternatively, the terminal device may initiate uplink data transmission without scheduling by the network device. Therefore, the terminal device needs to notify the network device of a coding scheme of a channel, so that the network device performs decoding. In this scenario, the first device may explicitly or implicitly indicate a coding scheme of the uplink data. The following provides possible implementations with reference to FIG. 3 to FIG. 7.

Figure 3:
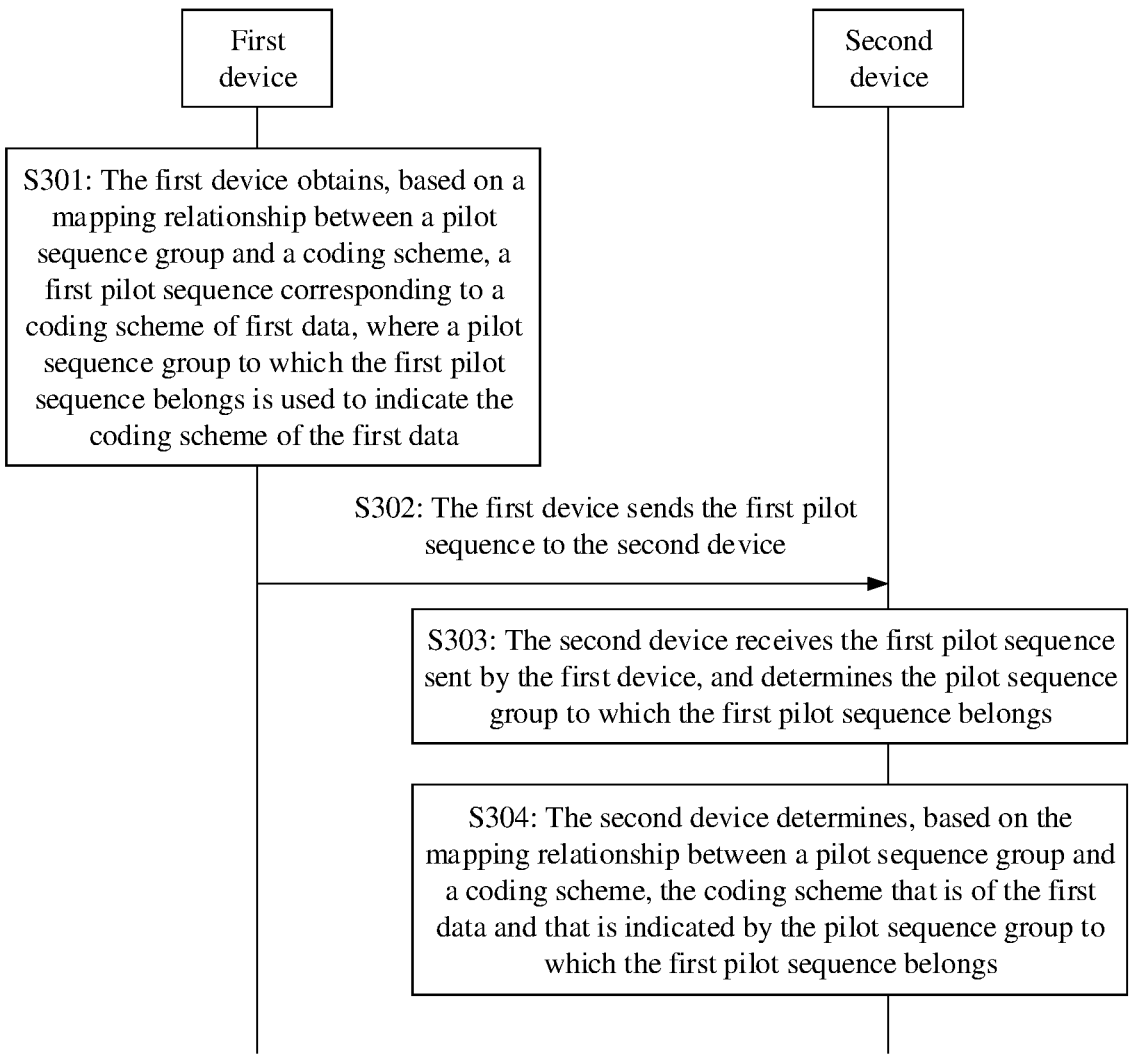
FIG. 3 is a signaling flowchart of a coding scheme indication method according to an embodiment of this application.

FIG. 3 is a signaling flowchart of a coding scheme indication method according to an embodiment of this application. As shown in FIG. 3, the method includes the following steps:

S301: The first device obtains, based on a mapping relationship between a pilot sequence group and a coding scheme, a first pilot sequence corresponding to the coding scheme of the first data, where a pilot sequence group to which the first pilot sequence belongs is used to indicate the coding scheme of the first data.

S302: The first device sends the first pilot sequence to the second device.

S303. The second device receives the first pilot sequence sent by the first device, and determines the pilot sequence group to which the first pilot sequence belongs.

S304. The second device determines, based on the mapping relationship between a pilot sequence group and a coding scheme, the coding scheme of the first data that is indicated by the pilot sequence group to which the first pilot sequence belongs.

In a specific implementation process, the first device first determines the coding scheme of the first data. The first device may determine the coding scheme of the first data based on at least one of channel quality, a service type of the first data, and a capability of the first device. The channel quality is a quality of a channel between the first device and the second device. The service type is, for example, a service that requires extremely high reliability, or a service that requires relatively high throughput and relatively low reliability. The capability of the first device may be hardware and software capabilities of the first device. For example, if the first device is a low-cost device, an encoder/decoder may be equipped for the first device. The first device may determine the coding scheme of the first data based on one, two, or three of the foregoing conditions. A specific implementation of determining the coding scheme of the first data by the first device is not particularly limited in this embodiment.

After obtaining the coding scheme of the first data, the first device obtains the first pilot sequence corresponding to the coding scheme of the first data, where the pilot sequence group to which the first pilot sequence belongs is used to indicate the coding scheme of the first data.

Specifically, the pilot sequence is also referred to as a pilot signal, and includes a non-zero pilot and a zero pilot (also referred to as a null pilot). The pilot sequence is usually used for channel estimation and radio frequency distortion compensation in a communications system. In a scheduling-free communications system, the pilot sequence is used for user detection.

Figure 4:
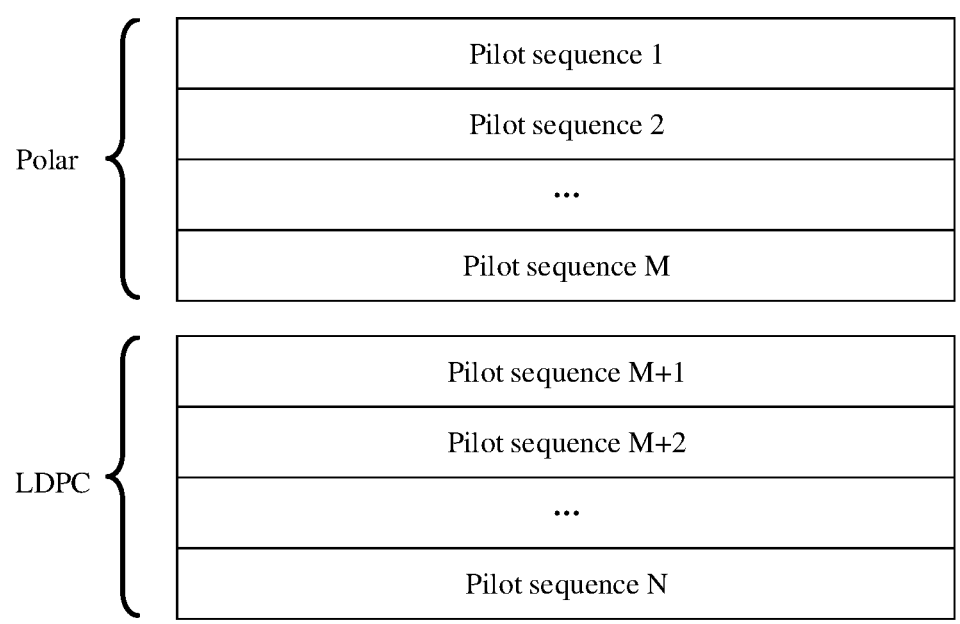
FIG. 4 is a schematic diagram of a mapping relationship between a pilot sequence group and a coding scheme according to an embodiment of this application.

In this embodiment, pilot sequences are divided into two groups, and each group corresponds to one coding scheme. FIG. 4 is a schematic diagram of a mapping relationship between a pilot sequence group and a coding scheme according to an embodiment of this application. As shown in FIG. 4, a pilot sequence 1 to a pilot sequence M belong to a polar coding scheme group, and a pilot sequence M+1 to a pilot sequence N correspond to an LDPC coding scheme group. When determining that the coding scheme of the first data is a polar coding scheme, the first device selects a first pilot sequence from the polar coding scheme group, in other words, the pilot sequence 1 to the pilot sequence M, and sends the first pilot sequence to the second device. When determining that the coding scheme of the first data is an LDPC coding scheme, the second device selects a first pilot sequence from the LDPC coding scheme group, in other words, the pilot sequence M+1 to the pilot sequence N.

After the first device selects and obtains the first pilot sequence, the first device may send the first pilot sequence and the first data (the uplink data) to the second device. The second device may detect the first device based on the first pilot sequence, determine the coding scheme of the first data based on the pilot sequence group to which the first pilot sequence belongs, and then decode the first data based on the coding scheme of the first data.

A person skilled in the art may understand that in a specific implementation process, pilot sequences may not be grouped, and there is only the mapping relationship between a pilot sequence and a coding scheme. For example, the first device obtains, based on the mapping relationship between a pilot sequence and a coding scheme, the first pilot sequence corresponding to the coding scheme of the first data. Correspondingly, the second device obtains, based on the mapping relationship between a pilot sequence and a coding scheme, the coding scheme of the first data that is indicated by the first pilot sequence.

In this embodiment of this application, the coding scheme is implicitly indicated based on the mapping relationship between a pilot sequence group and a coding scheme. The coding scheme indication does not need to be separately sent, and existing information, signaling, or the like does not need to be changed, namely, an existing transmission mode does not need to be changed. Therefore, a process in which the first device sends the coding scheme indication to the second device is simple and easy to be implemented.

Figure 5:
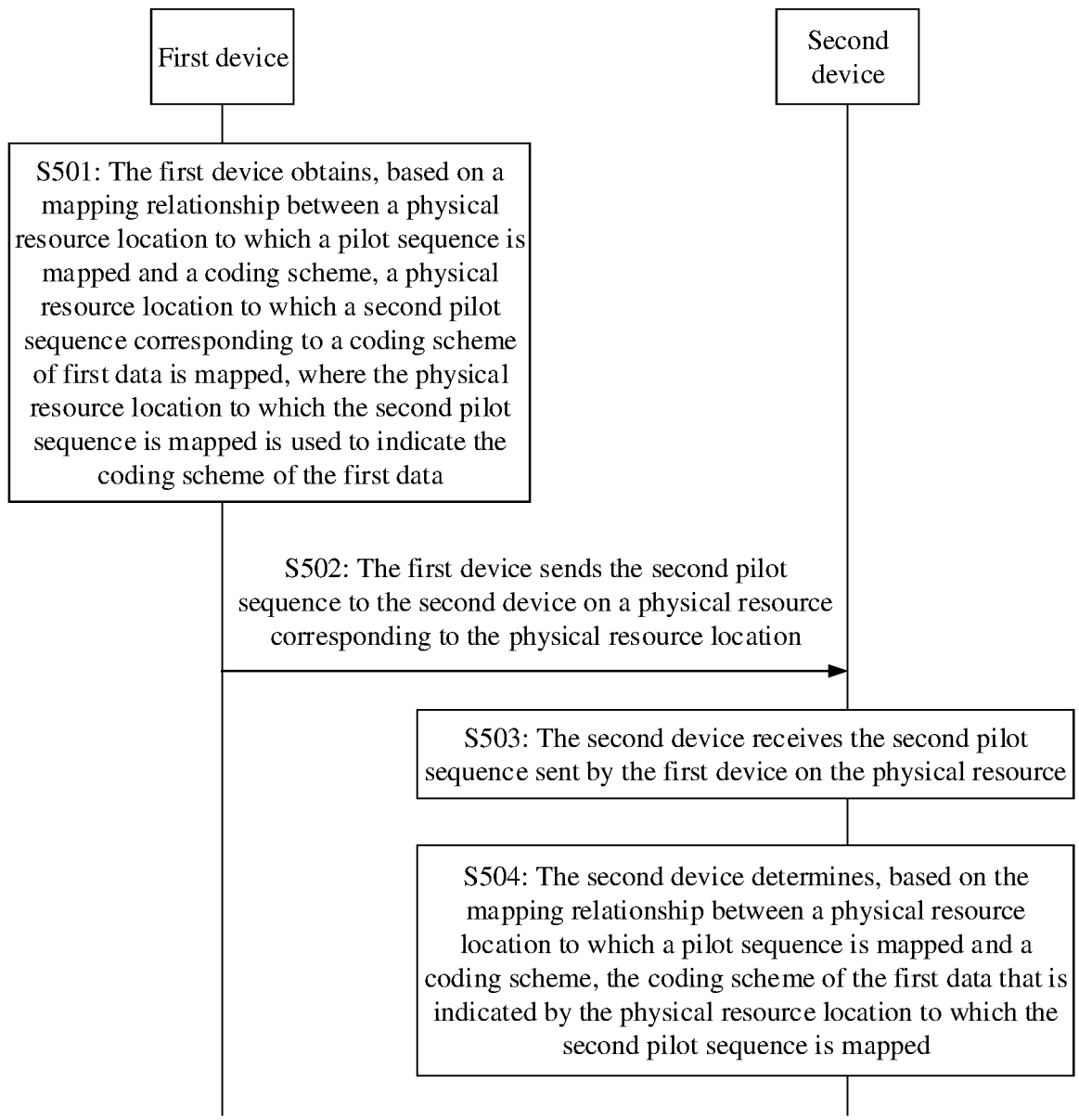
FIG. 5 is a signaling flowchart of a coding scheme indication method according to an embodiment of this application.

FIG. 5 is a signaling flowchart of a coding scheme indication method according to an embodiment of this application. As shown in FIG. 5, the method includes the following steps:

S501: The first device obtains, based on a mapping relationship between a physical resource location to which a pilot sequence is mapped and a coding scheme, a physical resource location to which a second pilot sequence corresponding to the coding scheme of the first data is mapped, where the physical resource location to which the second pilot sequence is mapped is used to indicate the coding scheme of the first data.

S502: The first device sends the second pilot sequence to the second device on a physical resource corresponding to the physical resource location.

S503: The second device receives the second pilot sequence sent by the first device on the physical resource.

S504: The second device determines, based on the mapping relationship between a physical resource location to which a pilot sequence is mapped and a coding scheme, the coding scheme of the first data that is indicated by the physical resource location to which the second pilot sequence is mapped.

A difference between this embodiment and this embodiment in FIG. 3 lies in that, in this embodiment, there is no mapping relationship between a pilot sequence and a coding scheme, but there is a mapping relationship between a physical resource location to which the pilot sequence is mapped and a coding scheme.

For example, when the first device uses a polar encoding scheme, the second pilot sequence is mapped to a physical resource location corresponding to polar code, or when the first device uses an LDPC encoding scheme, the second pilot sequence is mapped to a physical resource location corresponding to LDPC code. If detecting, at the physical resource location corresponding to the polar code, the second pilot sequence sent by the first device, the second device decodes the user data by using the polar code. Similarly, the LDPC code is used.

A meaning and a function of the second pilot sequence in this embodiment are similar to those of the first pilot sequence in this embodiment in FIG. 3. Details are not described herein in this embodiment.

In a specific implementation process, the physical resource location may be a time domain location and/or a frequency domain location of a physical resource to which the second pilot sequence is mapped. For example, a time domain location of a physical resource to which the second pilot sequence corresponding to the polar code and the LDPC code is mapped may be limited, and a frequency domain location is not limited. For another example, a frequency domain location of a physical resource to which the second pilot sequence corresponding to the polar code and the LDPC code is mapped may be alternatively limited. For another example, a time domain location and a frequency domain location of a physical resource to which the second pilot sequence corresponding to the polar code and the LDPC code is mapped may be alternatively limited. A manner of mapping the second pilot sequence to the physical resource is not particularly limited in this embodiment, provided that the first device and the second device pre-agree on a same rule, and can identify the polar coding scheme and the LDPC coding scheme.

Figure 6:
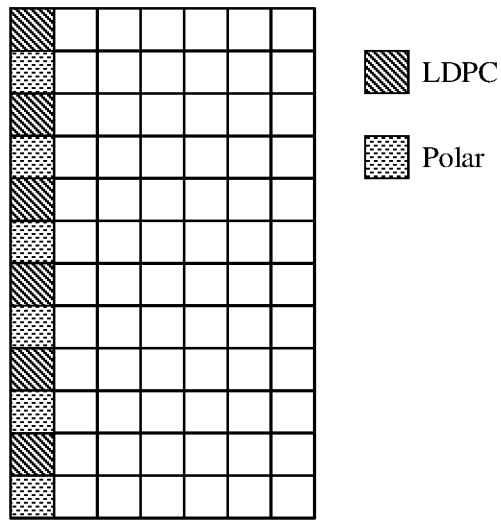
FIG. 6 is a schematic diagram of a mapping relationship between a physical resource location and a coding scheme according to an embodiment of this application.

For example, FIG. 6 is a schematic diagram of a mapping relationship between a physical resource location and a coding scheme according to an embodiment of this application. Specifically, if a pilot sequence is r(m), a mapping location of the pilot sequence may be calculated by using the following formula:

$a_{k,l}$=r(m), where l is an index (index) of a time-domain orthogonal frequency division multiplexing (OFDM) symbol, and k is an index of a subcarrier. The first device and the second device agree on the index. Alternatively, the index may be provided in a standard as follows:

$$k = \begin{cases} 2m+1, & \text{for Polar} \\ 2m, & \text{for LPDC,} \end{cases}$$

where m is a natural number.

If the physical resource location to which the second pilot sequence is mapped is an even-numbered bit in frequency domain, the coding scheme indication is used to indicate the LDPC coding scheme; or if the physical resource location to which the second pilot sequence is mapped is an odd-numbered bit in frequency domain, the coding scheme indication is used to indicate the polar coding scheme.

As shown in FIG. 6, a first symbol in time domain is used to transmit the second pilot sequence. When the second pilot sequence is transmitted in an even-numbered bit (counted from bottom to top) in frequency domain, the coding scheme indication is used to indicate the LDPC coding scheme. When the second pilot sequence is transmitted in an odd-numbered bit (counted from bottom to top) in frequency domain, the coding scheme indication is used to indicate the polar coding scheme.

A person skilled in the art may understand that, alternatively, if the physical resource location to which the second pilot sequence is mapped is an even-numbered bit in frequency domain, the coding scheme indication is used to indicate the polar coding scheme; or if the physical resource location to which the second pilot sequence is mapped is an odd-numbered bit in frequency domain, the coding scheme indication is used to indicate the LDPC coding scheme.

In this embodiment of this application, the coding scheme is implicitly indicated based on the mapping relationship between a physical resource location to which a pilot sequence is mapped and a coding scheme. The coding scheme indication does not need to be separately sent, and existing information, signaling, or the like is not changed, namely, an existing transmission mode does not need to be changed. Therefore, a process in which the first device sends the coding scheme indication to the second device is simple and easy to be implemented.

In this embodiment of this application, both a pilot sequence and a physical resource location to which the pilot sequence is mapped may be alternatively used for indication. For example, considering a case in which a plurality of users share a physical resource in a non-orthogonal access mode in the scheduling-free system, to reduce a collision probability of the users, a channel coding scheme may be indicated by using both the pilot sequence and a time-frequency resource location to which the pilot sequence is mapped.

Figure 7:
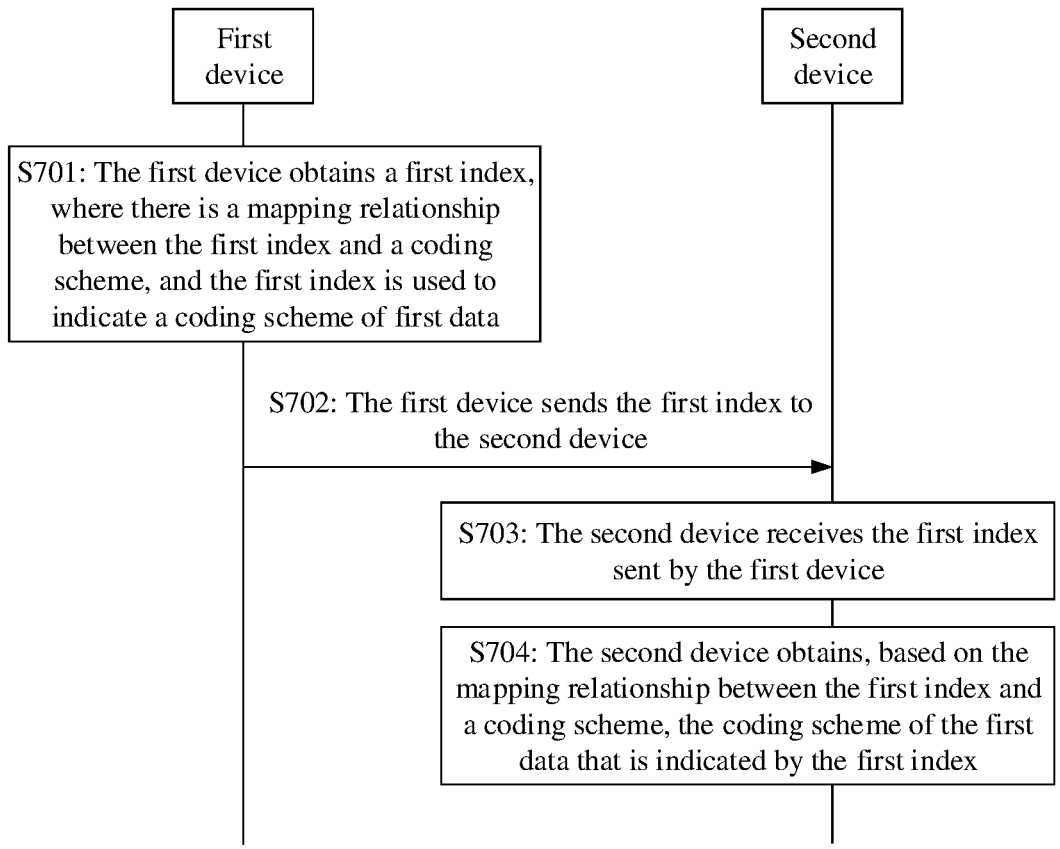
FIG. 7 is a signaling flowchart of a coding scheme indication method according to an embodiment of this application.

FIG. 7 is a signaling flowchart of a coding scheme indication method according to an embodiment of this application. As shown in FIG. 7, the method includes the following steps:

S701: The first device obtains a first index, where there is a mapping relationship between the first index and a coding scheme, and the first index is used to indicate the coding scheme of the first data.

S702: The first device sends the first index to the second device.

S703: The second device receives the first index sent by the first device.

S704: The second device obtains, based on the mapping relationship between the first index and a coding scheme, the coding scheme of the first data that is indicated by the first index.

In this embodiment, the first index may be any index sent by the first device to the second device. In a specific example, the first index may be a channel quality indicator (CQI) index.

Channel quality is obtained by the first device through measurement. Therefore, the channel quality usually is downlink channel quality, and corresponds to a signal-to-noise ratio of a channel. The channel quality may be quantized as a channel quality indicator (CQI) index, where a value range of the CQI index is from 0 to 15. When a CQI value is 0, the channel quality is the worst. Alternatively, when a CQI value is 15, the channel quality is the best. The second device may determine a size of a to-be-transmitted data block, an amount of channel code, a coding scheme, a modulation scheme, and the like based on the CQI value.

After obtaining the first index, the first device may directly send the first index to the second device, and the second device obtains, based on the mapping relationship between the first index and a coding scheme, the coding scheme of the first data that is indicated by the first index. In a possible implementation, Table 1 provides a mapping table, and the mapping table indicates a mapping relationship between a CQI index and a coding scheme.

TABLE 1

| Index | Spectral efficiency Spectral efficiency | Code rate Code rate | Modulation order Modulation order | Coding scheme Code scheme |
|---|---|---|---|---|
| 0 | — | — | | |
| 1 | a1 | b1 | 2 | Polar |
| 2 | a2 | b2 | | |
| 3 | a3 | b3 | | |
| 4 | a4 | b4 | | |
| 5 | a5 | b5 | | |
| 6 | a6 | b6 | | |
| 7 | a7 | b7 | | |
| 8 | a8 | b8 | | |
| 9 | a9 | b9 | | LDPC |
| 10 | a10 | b10 | | |
| 11 | a11 | b11 | | |
| 12 | a12 | b12 | 4 | |
| 13 | a13 | b13 | | |
| 14 | a14 | b14 | | |
| 15 | a15 | b15 | | |

The mapping table shown in Table 1 in this specification may also be referred to as a CQI table. The mapping table includes a mapping relationship between a CQI index and each of a modulation order, a code rate, spectral efficiency, and a coding scheme. Any CQI index in the mapping table and each of a modulation order, a code rate, spectral efficiency, or a coding scheme meet the mapping relationship shown in Table 1. Optionally, in a specific implementation process, the LDPC coding scheme may be further divided into a BG1 LDPC coding scheme or a BG2 LDPC coding scheme.

The modulation order is a quantity of bits transmitted on one symbol. For example, QPSK corresponds to a modulation order 2, 16QAM corresponds to a modulation order 4, and 64QAM corresponds to a modulation order 6.

The code rate is a ratio of a quantity of information bits in a transport block to a total quantity of bits on a physical channel.

The spectral efficiency represents an information bit that can be carried in one resource element (RE).

The spectral efficiency and the code rate are interconvertible. Therefore, in actual application, the spectral efficiency and the code rate may appear in two columns of Table 1, or only one of the two columns may appear. According to Table 1, each CQI corresponds to one index. When the CQI index is from 1 to 9 (including 1 and not including 9), a data channel uses a polar code encoding scheme. When the CQI index is from 9 to 15 (including 9 and 15), a data channel uses LDPC code encoding scheme. The first device obtains an index in the CQI table based on information such as a channel condition, and feeds back the index to the second device. The second device obtains, from the mapping table based on the received CQI index, a data channel coding scheme that the first device expects to use. When there is no other indication information, the base station uses the coding scheme corresponding to the CQI index.

A person skilled in the art may understand that both the first device and the second device pre-store the mapping table. The first device selects a CQI index from the pre-stored mapping table based on an obtained modulation order, an obtained code rate, obtained frequency utilization efficiency, or an obtained coding scheme. The second device obtains, from the pre-stored mapping table based on the CQI index, a coding scheme corresponding to the CQI index.

In this embodiment of this application, the first device sends the first index to the second device, and the second device obtains the coding scheme of the first data based on the first index. To be specific, the coding scheme is implicitly indicated, the coding scheme indication does not need to be separately sent, and existing information, signaling, or the like is not changed, namely, an existing transmission mode does not need to be changed. Therefore, a process in which the first device sends the coding scheme indication to the second device is simple and easy to be implemented.

A person skilled in the art may understand that the foregoing embodiment shown in FIG. 3 to FIG. 7 may be applied to not only the scheduling-free system, but also a system for scheduling a network device. Implementation principles and technical effects thereof are similar, and details are not described herein in this embodiment.

In another possible implementation, this embodiment is applied to a system in which a network device schedules a terminal device. In the system, the first device may be a network device, the second device is a terminal device, the first data is downlink data, and the second data is uplink data. To be specific, the network device determines a coding scheme of the uplink data sent by the terminal device to the network device, and the network device sends a coding scheme of the downlink data to the terminal device. In the scheduling system, the network device needs to perform scheduling when the terminal device sends uplink data to the network device or when the network device sends downlink data to the terminal device. The scheduling may be resource scheduling, coding scheme scheduling, or the like.

In a specific implementation process, the first device generates information, where the information is used to indicate the coding scheme of the first data and/or the coding scheme of the second data, and the first device sends the information to the second device. The second device receives the information, and obtains the coding scheme of the first data and/or the coding scheme of the second data based on the information.

The first device first determines the coding scheme of the first data and/or the coding scheme of the second data, and then generates the information. The first device may determine the coding scheme of the first data based on at least one of channel quality, a service type of the first data, and a capability of the second device, and/or the first device determines the coding scheme of the second data based on at least one of channel quality, a service type of the second data, and a capability of the second device. For a specific implementation, refer to the foregoing embodiment. Details are not described herein in this embodiment.

The information in this embodiment may be understood as information, signaling, a message, or the like in a broad sense. A person skilled in the art may understand that the information may be control plane information or data plane information. The control plane information may also be referred to as signaling. A manner in which the first device sends the information to the second device is also applicable to that the first device is the terminal device and the second device is the network device.

Figure 8:
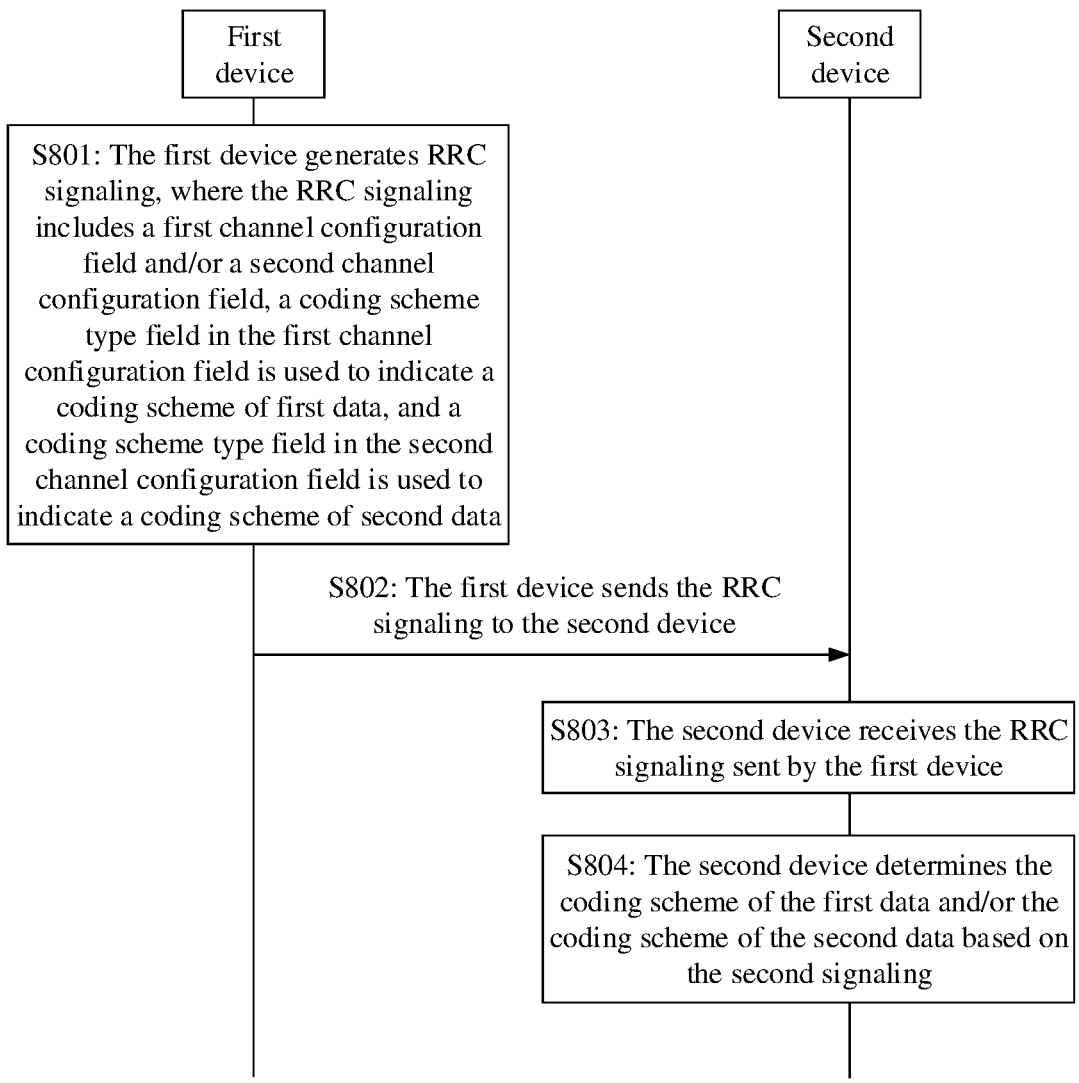
FIG. 8 is a signaling flowchart of a coding scheme indication method according to an embodiment of this application.
Figure 9:
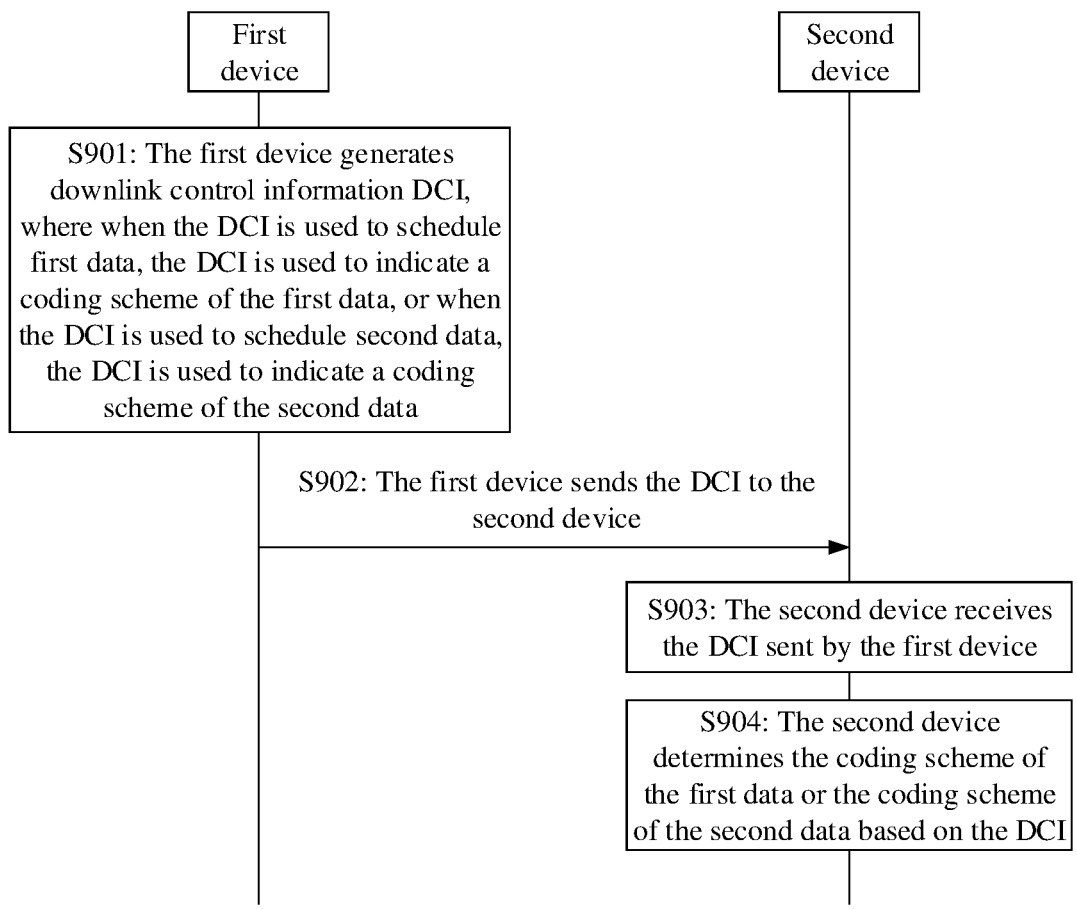
FIG. 9 is a signaling flowchart of a coding scheme indication method according to an embodiment of this application.

With reference to FIG. 8 to FIG. 10, the following describes in detail a coding scheme indication method in the scheduling system. To be specific, the first device is a network device, and the second device is a terminal device. The foregoing information may be various types of information. A type of information is not particularly limited in this embodiment, and some examples are provided herein. A person skilled in the art may understand that FIG. 8 to FIG. 10 may be applied to not only the scheduling system, but also another system. Details are not described herein in this embodiment.

FIG. 8 is a signaling flowchart of a coding scheme indication method according to an embodiment of this application. As shown in FIG. 8, the method includes the following steps.

S801: The first device generates RRC signaling, where the RRC signaling includes a first channel configuration field and/or a second channel configuration field, a coding scheme type field in the first channel configuration field is used to indicate the coding scheme of the first data, and a coding scheme type field in the second channel configuration field is used to indicate the coding scheme of the second data.

S802: The first device sends the RRC signaling to the second device.

S803: The second device receives the RRC signaling sent by the first device.

S804: The second device determines the coding scheme of the first data and/or the coding scheme of the second data based on the second signaling.

In this embodiment, the foregoing message may be the radio resource control (RRC) signaling, and the RRC signaling may be system information or the like. In this embodiment, the system information is used as an example for description. The system information may be divided into a master information block and a system information block. The coding scheme indication may be carried in the master information block, or the coding scheme indication may be carried in the system information block. This is not particularly limited in this embodiment.

In a specific embodiment, the first channel configuration field and/or the second channel configuration field are/is carried in the system information block. The coding scheme type field in the first channel configuration field is used to indicate the coding scheme of the first data. The coding scheme type field in the second channel configuration field is used to indicate the coding scheme of the second data. The first device may indicate the coding scheme of the first data, or may indicate the coding scheme of the second data, or may indicate both the coding scheme of the first data and the coding scheme of the second data. Optionally, when there are a plurality of system information blocks, the first channel configuration field and/or the second channel configuration field may be carried in one system information block, or the first channel configuration field and the second channel configuration field may be separately carried in different system information blocks.

Specifically, when the first data is uplink data, the first channel configuration field may be a physical downlink shared channel (PDSCH) configuration field, in other words, a PDSCH-Config field. A channel coding scheme type (channel Coding Type) field may be added to the PDSCH-Config to indicate a channel coding scheme type of downlink data. The channel coding type may be Boolean, where 'true' and 'false' are used to distinguish the Polar and the LDPC. Alternatively, the channel coding type may be another type, for example, may be an integer (INTEGER), where '0' and '1' are used to distinguish the Polar and the LDPC, or may be enumerated (ENUMERATED), where 'Polar' and 'LDPC' are used to directly indicate that the coding scheme is the Polar or the LDPC.

Optionally, the PDSCH-Config field may further include a code block group transmission field, used to indicate whether to use code block group (CBG)-based transmission, where a maxCodeBlockGroupsPerTransportBlock is used to indicate a maximum quantity of code block groups included in each transport block (TB). The PDSCH-Config further includes configuration parameters of parameters such as a demodulation reference signal (dmrs), and a transmission configuration indicator (TCI). Details are not described herein.

When the second data is downlink data, the second channel configuration field may be a physical uplink shared channel (PUSCH) configuration field, in other words, a PUSCH-Config field. Similarly, a channel coding scheme type (channel Coding Type) field may be added to the PUSCH-Config to indicate a channel coding scheme type of uplink data. An implementation of the channel coding type field in the PUSCH-Config field is similar to that of the channel coding type field in the PDSCH-Config field. Details are not described herein in this embodiment. For another field in the PUSCH-Config field, details are not described herein in this embodiment.

The first device may generate the system information block, and send the system information block to the second device. The second device determines the coding scheme of the first data and/or the coding scheme of the second data based on the coding scheme type indication field in the first channel configuration field and/or the coding scheme type field in the second channel configuration field in the system information block.

In this embodiment of this application, the coding scheme is indicated by using the RRC signaling. Because the RRC signaling runs during an entire communication process between the first device and the second device, no new information needs to be added when the RRC signaling is used. In addition that the coding scheme indication is easily sent, coding schemes can be aligned at a receive end and a transmit end.

FIG. 9 is a signaling flowchart of a coding scheme indication method according to an embodiment of this application. As shown in FIG. 9, the method includes the following steps.

S901: The first device generates downlink control information DCI, where when DCI is used to schedule the first data, the DCI is used to indicate the coding scheme of the first data, or when the DCI is used to schedule the second data, the DCI is used to indicate the coding scheme of the second data.

S902: The first device sends the DCI to the second device.

S903: The second device receives the DCI sent by the first device.

S904: The second device determines the coding scheme of the first data or the coding scheme of the second data based on the DCI.

In a specific implementation process, the downlink control information (DCI) may explicitly indicate the coding scheme, or may implicitly indicate the coding scheme. Details are separately described below. The DCI may be used for uplink data scheduling or downlink data scheduling, may be used for resource allocation, and may include other control information and the like.

When the DCI explicitly indicates the coding scheme, a coding scheme type field may be added to the DCI, to indicate the coding scheme of the first data or the coding scheme of the second data.

FIG. 10 is a schematic structural diagram of DCI according to an embodiment of this application. As shown in FIG. 10, a coding scheme type field is added to the DCI. For example, the coding scheme type field may distinguish the Polar and the LDPC by using integers (INTEGER) '0' and '1'.

A person skilled in the art may understand that when the information is used to schedule the first data, the coding scheme type field in the information is used to indicate the coding scheme of the first data. Alternatively, when the information is used to schedule the second data, the coding scheme type field in the information is used to indicate the coding scheme of the second data. To be specific, when the DCI schedules the uplink data, the coding scheme type field in the DCI is used to indicate the coding scheme of the uplink data, or when the DCI schedules the downlink data, the coding scheme type field in the DCI is used to indicate the coding scheme of the downlink data. This ensures scheduling consistency between the coding scheme type field and the DCI.

Optionally, the DCI may further include fields such as a header, a carrier indicator, a BWP indicator (bandwidth part indicator), an F resource (frequency domain resource location), a T resource (time domain resource location), an MCS index (modulation and coding scheme index), an RV version (redundancy version), and an NDI (new data indicator).

When the DCI implicitly indicates the coding scheme, a second index may be carried in the DCI to implicitly indicate the coding scheme. The second index may be any index carried in the DCI. In a possible implementation, the modulation and coding scheme (MCS) index in the DCI field may be used for implicit indication.

Specifically, in a possible communications system, a physical shared channel may be divided into an uplink physical channel and a downlink physical channel. Both the uplink physical channel and the downlink physical channel support a plurality of modulation schemes such as quadrature phase shift keying (QPSK), 16 quadrature amplitude modulation (16QAM), and 64QAM. Constellation diagrams corresponding to modulation schemes sequentially require different channel conditions. In a word, a higher modulation scheme (QPSK<16QAM<64QAM) requires a better channel condition.

Different modulation schemes and modulation orders correspond to different coding schemes. Each modulation order, each modulation order, each coding scheme, or the like may be indicated by using an MCS index. Table 2 is a mapping table, and the mapping table represents a mapping relationship between an MCS index and a coding scheme.

TABLE 2

| Index Index | Spectral efficiency Spectral efficiency | Code rate Code Rate | Modulation order Modulation order | Coding scheme Code scheme |
|---|---|---|---|---|
| o | X1 | Y1 | 2 | Polar |
| ... | ... | ... | ... | ... |
| m | X2 | Y2 | 4 | Polar |
| ... | ... | ... | ... | ... |
| n | X3 | Y3 | 6 | LDPC |
| ... | ... | ... | ... | ... |

The mapping table shown in Table 2 in this specification may also be referred to as an MCS table. The mapping table includes a mapping relationship between an MCS index and each of a modulation order, a code rate, spectral efficiency, or a coding scheme. Any MCS index in the mapping table and each of a modulation order, a code rate, spectral efficiency, or a coding scheme meet the mapping relationship shown in Table 2.

For specific meanings of the modulation order, the code rate, the spectral efficiency, or the coding scheme, refer to Table 1. Details are not described herein in this embodiment.

Both the first device and the second device pre-store the mapping table. The first device obtains the second index. There is a mapping relationship between the second index and a coding scheme. The first device generates the information based on the second index. The information includes the second index. The second index is used to indicate the coding scheme of the first data or the coding scheme of the second data. The second index may be the MCS index.

Specifically, the network device may determine a modulation order and a coding scheme of the uplink data or the downlink data, and then determine an MCS index based on the determined modulation order, the determined coding scheme, and content shown in the pre-stored mapping table. A specific implementation in which the network device determines the modulation order and the coding scheme is not particularly limited in this embodiment. In a specific application process, the mapping relationship between an MCS index and a coding scheme may be implemented in a table, or may be implemented in another manner. When Table 2 is used for implementation, Table 2 may include two or more columns including an MCS index and a coding scheme. An implementation of Table 2 is not particularly limited in this embodiment.

After determining the MCS index, the network device generates DCI including the MCS index. The network device sends the DCI to the terminal device, to send the MCS index to the terminal device by using the DCI. The terminal device queries the pre-stored mapping table (Table 2) based on the MCS index, to obtain a channel coding scheme.

A person skilled in the art may understand that when the information is the DCI, if the DCI is used to schedule the first data (the uplink data), the second index in the DCI is used to indicate the coding scheme of the first data. Alternatively, if the DCI is used to schedule the second data (the downlink data), the second index in the DCI is used to indicate the coding scheme of the second data.

In this embodiment of this application, the DCI explicitly or implicitly indicates the coding scheme. The coding scheme may be indicated only based on the existing information, and no other information is needed. Therefore, coding schemes can be aligned at a transmit end and a receive end.

Based on the foregoing embodiment, for example, in addition that the terminal device indicates the coding scheme of the uplink data sent by the terminal device to the network device, the network device may alternatively re-indicate the coding scheme to the terminal device instead of using the coding scheme indicated by the terminal device. The following provides detailed descriptions with reference to FIG. 11.

Figure 11:
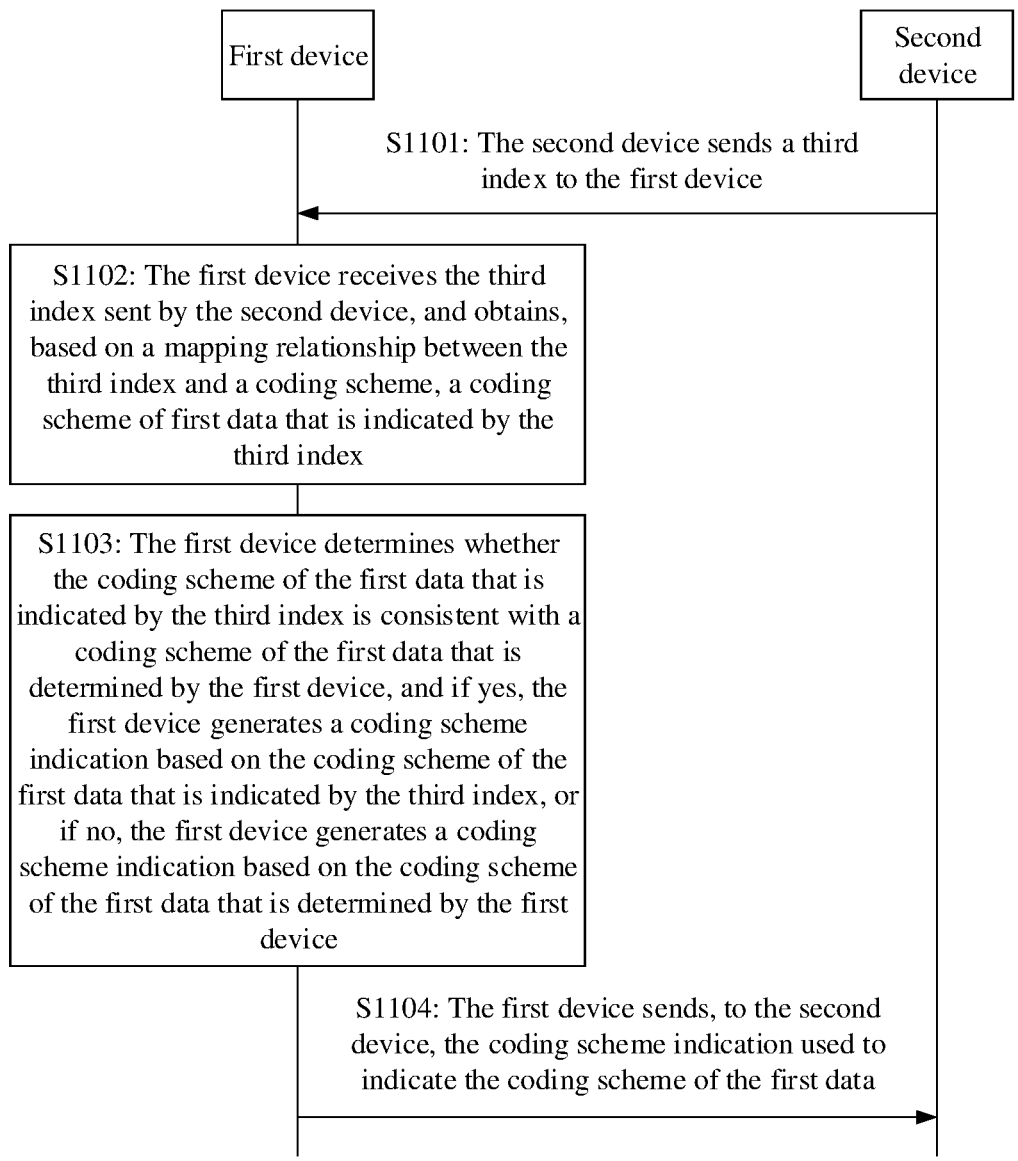
FIG. 11 is a signaling flowchart of a coding scheme indication method according to an embodiment of this application.

FIG. 11 is a signaling flowchart of a coding scheme indication method according to an embodiment of this application. As shown in FIG. 11, the method includes the following steps:

S1101 The second device sends a third index to the first device.

S1102: The first device receives the third index sent by the second device, and obtains, based on a mapping relationship between the third index and a coding scheme, a coding scheme of the first data that is indicated by the third index.

S1103: The first device determines whether the coding scheme of the first data that is indicated by the third index is consistent with the coding scheme of the first data that is determined by the first device, and if yes, the first device generates the coding scheme indication based on the coding scheme of the first data that is indicated by the third index, or if no, the first device generates the coding scheme indication based on the coding scheme of the first data that is determined by the first device.

S1104: The first device sends, to the second device, the coding scheme indication used to indicate the coding scheme of the first data.

In this embodiment, the third index may be any index sent by the second device to the first device. In a possible implementation, the first device is a network device, the second device is a terminal device, and the third index is a CQI index. Specifically, the second device receives the CQI index sent by the first device, the first device receives the CQI index, and the first device may obtain the coding scheme of the first data by querying Table 1 based on the CQI index. The coding scheme is a coding scheme expected by the second device.

The CQI index not only has a mapping relationship with a coding scheme, but also may indicate channel quality. It can be learned from the foregoing description that the network device may determine the coding scheme of the first data based on at least one of channel quality, a service type of the first data, and a capability of the first device. Therefore, the network device may determine the channel coding scheme based on the CQI or with reference to other information.

If the coding scheme of the first data that is indicated by the third index is consistent with the coding scheme of the first data that is determined by the network device, the network device generates the coding scheme indication based on the coding scheme of the first data that is indicated by the third index, where the coding scheme of the first data that is indicated by the coding scheme indication is consistent with the coding scheme of the first data that is indicated by the third index.

Alternatively, if the coding scheme of the first data that is indicated by the third index is inconsistent with the coding scheme of the first data that is determined by the network device, the network device generates the coding scheme indication based on the coding scheme of the first data that is determined by the network device, where the coding scheme of the first data that is indicated by the coding scheme indication is consistent with the coding scheme of the first data that is determined by the network device.

After generating the coding scheme indication, the network device may send the coding scheme indication to the terminal device in the manner shown in FIG. 8 to FIG. 10, for example, by using RRC signaling or DCI.

In this embodiment of this application, the first device comprehensively considers the coding scheme of the first data, so that the coding scheme of the first data is more suitable for channel transmission and meets a service transmission requirement and the like.

Figure 12:
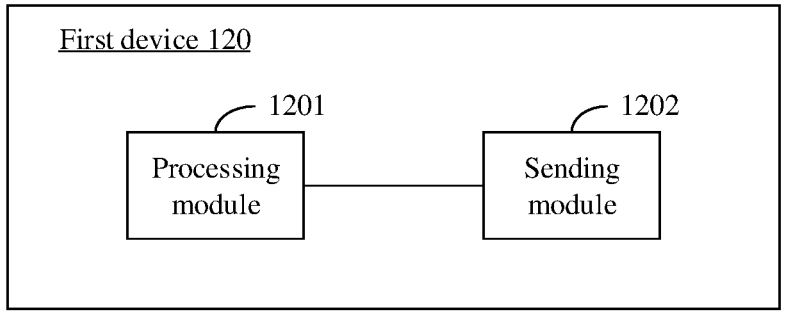
FIG. 12 is a schematic structural diagram of a coding scheme indication device according to an embodiment of this application.

FIG. 12 is a schematic structural diagram of a coding scheme indication device according to an embodiment of this application. The device in this embodiment may be the first device provided in the foregoing embodiments. The first device 120 includes a processing module 1201 and a sending module 1202.

The processing module 1201 is configured to obtain a coding scheme indication, where the coding scheme indication is used to indicate a coding scheme of first data and/or a coding scheme of second data, the first data is data sent by the first device to a second device, the coding scheme of the first data is a polar coding scheme or a low-density parity-check LDPC coding scheme, the second data is data sent by the second device to the first device, and the coding scheme of the second data is a polar coding scheme or an LDPC coding scheme.

The sending module 1202 is configured to send the coding scheme indication to the second device.

In a possible design, the processing module 1201 is specifically configured to obtain, based on a mapping relationship between a pilot sequence group and a coding scheme, a first pilot sequence corresponding to the coding scheme of the first data, where a pilot sequence group to which the first pilot sequence belongs is used to indicate the coding scheme of the first data.

The sending module 1202 is specifically configured to send the first pilot sequence to the second device.

In a possible design, the processing module 1201 is specifically configured to obtain, based on a mapping relationship between a physical resource location to which a pilot sequence is mapped and a coding scheme, a physical resource location to which a second pilot sequence corresponding to the coding scheme of the first data is mapped, where the physical resource location to which the second pilot sequence is mapped is used to indicate the coding scheme of the first data.

The sending module 1202 is specifically configured to send the second pilot sequence to the second device on a physical resource corresponding to the physical resource location.

In a possible design, the processing module 1201 is specifically configured to obtain a first index, where there is a mapping relationship between the first index and a coding scheme, and the first index is used to indicate the coding scheme of the first data.

The sending module 1202 is specifically configured to send the first index to the second device.

In a possible design, the processing module 1201 is further configured to: before obtaining the coding scheme indication, determine the coding scheme of the first data based on at least one of channel quality, a service type of the first data, and a capability of the first device.

In a possible design, the processing module 1201 is specifically configured to generate information, where the information is used to indicate the coding scheme of the first data and/or the coding scheme of the second data.

The sending module 1202 is specifically configured to send the information to the second device.

In a possible design, the processing module 1201 is specifically configured to: obtain a second index, where there is a mapping relationship between the second index and a coding scheme; and generate the information based on the second index, where the information includes the second index, and the second index is used to indicate the coding scheme of the first data or the coding scheme of the second data.

In a possible design, the processing module 1201 is further configured to: before the first device generates the first information, obtain, based on a mapping relationship between a received third index sent by the second device and a coding scheme, a coding scheme of the first data that is indicated by the third index.

The processing module 1201 is specifically configured to: if the coding scheme of the first data that is indicated by the third index is consistent with a coding scheme of the first data that is determined by the first device, generate the coding scheme indication based on the coding scheme of the first data that is indicated by the third index; or if the coding scheme of the first data that is indicated by the third index is inconsistent with a coding scheme of the first data that is determined by the first device, generate the coding scheme indication based on the coding scheme of the first data that is determined by the first device.

In a possible design, the processing module 1201 is further configured to: before the first device obtains the coding scheme indication, determine the coding scheme of the first data based on at least one of channel quality, a service type of the first data, and a capability of the second device; and/or determine the coding scheme of the second data based on at least one of channel quality, a service type of the second data, and a capability of the second device.

The coding scheme indication device provided in this embodiment of this application may be configured to perform the method performed by the first device in the foregoing method embodiment. Implementation principles and technical effects thereof are similar. Details are not described herein.

Optionally, during hardware implementation, the processing module in this embodiment may be integrated into a processor for implementation, and the sending module may be integrated into a transmitter for implementation.

Figure 13:
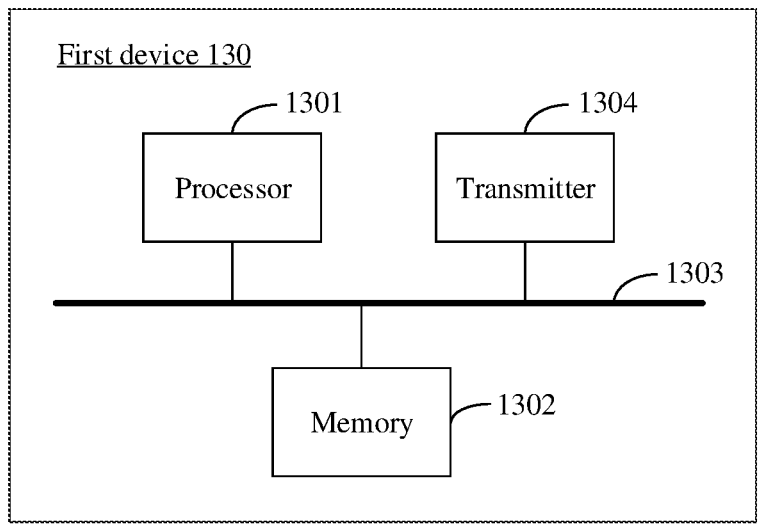
FIG. 13 is a schematic diagram of a hardware structure of a coding scheme indication device according to an embodiment of this application.

FIG. 13 is a schematic diagram of a hardware structure of a coding scheme indication device according to an embodiment of this application. As shown in FIG. 13, the indication device may be the first device in the foregoing embodiments. The first device 130 includes a processor 1301 and a memory 1302.

The memory 1302 is configured to store a computer program.

The processor 1301 is configured to execute the computer program stored in the memory, to implement the steps performed by the first device in the foregoing embodiments. For details, refer to related descriptions in the foregoing method embodiment.

Optionally, the memory 1302 may be independent, or may be integrated with the processor 1301.

When the memory 1302 is a component independent of the processor 1301, the first device 130 may further include a bus 1303, configured to connect the memory 1302 and the processor 1301.

The first device shown in FIG. 13 may further include a transmitter 1304, configured to send a coding scheme indication and the like.

The coding scheme indication device provided in this embodiment may be configured to perform the method performed by the first device in the foregoing instance. Implementation principles and technical effects thereof are similar. Details are not described herein in this embodiment.

Figure 14:
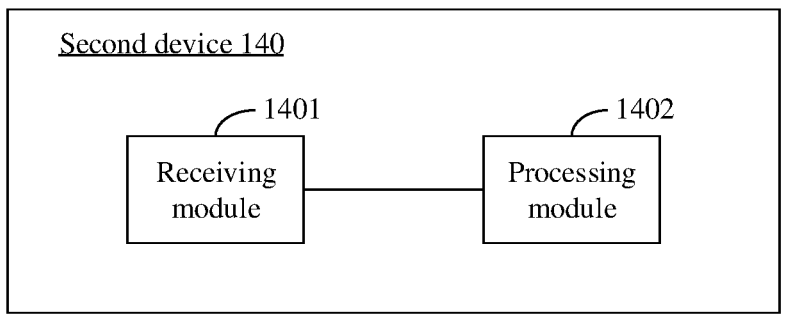
FIG. 14 is a schematic structural diagram of a coding scheme determining device according to an embodiment of this application.

FIG. 14 is a schematic structural diagram of a coding scheme determining device according to an embodiment of this application. The determining device in this embodiment may be the second device provided in the foregoing embodiments. The second device 140 includes a receiving module 1401 and a processing module 1402.

The receiving module 1401 is configured to receive a coding scheme indication sent by a first device, where the coding scheme indication is used to indicate a coding scheme of first data and/or a coding scheme of second data, the first data is data sent by the first device to the second device, the coding scheme of the first data is a polar coding scheme or a low-density parity-check LDPC coding scheme, the second data is data sent by the second device to the first device, and the coding scheme of the second data is a polar coding scheme or an LDPC coding scheme.

The processing module 1402 is configured to determine the coding scheme of the first data and/or the coding scheme of the second data based on the coding scheme indication.

In a possible design, the receiving module 1401 is specifically configured to receive a first pilot sequence sent by the first device, where a pilot sequence group to which the first pilot sequence belongs is used to indicate the coding scheme of the first data.

The processing module 1402 is specifically configured to: determine the pilot sequence group to which the first pilot sequence belongs, and determine, based on a mapping relationship between a pilot sequence group and a coding scheme, the coding scheme of the first data that is indicated by the pilot sequence group to which the first pilot sequence belongs.

In a possible design, the receiving module 1401 is specifically configured to receive a second pilot sequence sent by the first device on a physical resource, where a physical resource location to which the second pilot sequence is mapped is used to indicate the coding scheme of the first data.

The processing module 1402 is specifically configured to determine, based on a mapping relationship between a physical resource location to which a pilot sequence is mapped and a coding scheme, the coding scheme of the first data that is indicated by the physical resource location to which the second pilot sequence is mapped.

In a possible design, the receiving module 1401 is specifically configured to receive a first index sent by the first device, where there is a mapping relationship between the first index and a coding scheme, and the first index is used to indicate the coding scheme of the first data.

The processing module 1402 is specifically configured to obtain, based on the mapping relationship between the first index and a coding scheme, the coding scheme of the first data that is indicated by the first index.

In a possible design, the receiving module 1401 is specifically configured to receive information sent by the first device, where the information is used to indicate the coding scheme of the first data and/or used to indicate the coding scheme of the second data.

The processing module 1402 is specifically configured to determine the coding scheme of the first data and/or the coding scheme of the second data based on the information.

The coding scheme determining device provided in this embodiment of this application may be configured to perform the method performed by the second device in the foregoing method embodiment. Implementation principles and technical effects thereof are similar. Details are not described herein.

Optionally, during hardware implementation, the processing module in this embodiment may be integrated into a processor for implementation, and the receiving module may be integrated into a receiver for implementation.

Figure 15:
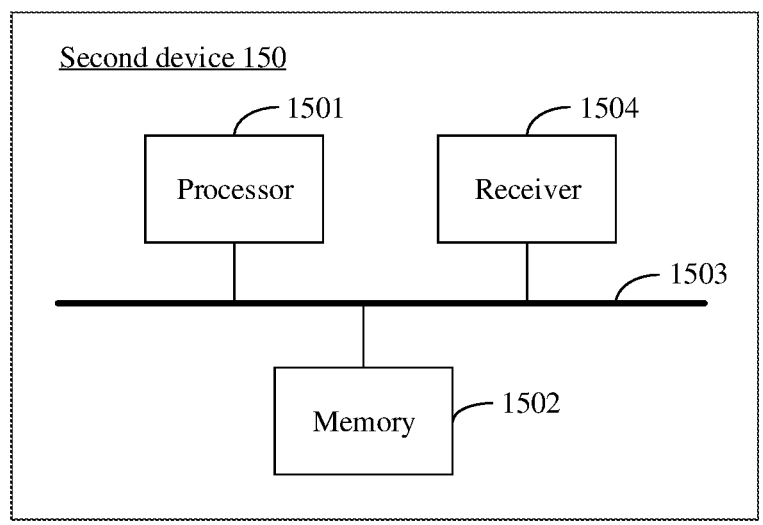
FIG. 15 is a schematic diagram of a hardware structure of a coding scheme determining device according to an embodiment of this application.

FIG. 15 is a schematic diagram of a hardware structure of a coding scheme determining device according to an embodiment of this application. The determining device in this embodiment may be the second device provided in the foregoing embodiments, and includes a processor 1501 and a memory 1502.

The memory 1502 is configured to store a computer program.

The processor 1501 is configured to execute the computer program stored in the memory, to implement the steps performed by the second device in the foregoing embodiments. For details, refer to related descriptions in the foregoing method embodiment.

Optionally, the memory 1502 may be independent, or may be integrated with the processor 1501.

When the memory 1502 is a component independent of the processor 1501, the second device 150 may further include a bus 1503, configured to connect the memory 1502 and the processor 1501.

The second device shown in FIG. 15 may further include a receiver 1504, configured to receive a coding scheme indication and the like.

The coding scheme determining device provided in this embodiment may be configured to perform the method performed by the second device in the foregoing instance. Implementation principles and technical effects thereof are similar. Details are not described herein in this embodiment.

An embodiment of this application further provides a storage medium, where the storage medium includes a computer program. The computer program is used to implement the coding scheme indication method performed by the first device in the foregoing embodiments.

An embodiment of this application further provides a storage medium, where the storage medium includes a computer program. The computer program is used to implement the coding scheme indication method performed by the second device in the foregoing embodiments.

An embodiment of this application further provides a computer program product, where the computer program product includes computer program code. When the computer program code is run on a computer, the computer is enabled to perform the coding scheme indication method performed by the first device.

An embodiment of this application further provides a chip, including a memory and a processor. The memory is configured to store a computer program, and the processor is configured to invoke the computer program from the memory and run the computer program, so that a communications device on which the chip is installed performs the coding scheme indication method performed by the first device.

An embodiment of this application further provides a computer program product, where the computer program product includes computer program code. When the computer program code is run on a computer, the computer is enabled to perform the coding scheme indication method performed by the second device.

An embodiment of this application further provides a chip, including a memory and a processor. The memory is configured to store a computer program, and the processor is configured to invoke the computer program from the memory and run the computer program, so that a communications device on which the chip is installed performs the coding scheme indication method performed by the second device.

In the several embodiments provided in this application, it should be understood that the disclosed device and method may be implemented in other manners. For example, the described device embodiment is merely an example. For example, the module division is merely logical function division and may be other division in actual implementation. For example, a plurality of modules may be combined or integrated into another system, or some features may be ignored or not performed. In addition, the displayed or discussed mutual couplings or direct couplings or communication connections may be implemented through some interfaces. The indirect couplings or communication connections between the apparatuses or modules may be implemented in electronic, mechanical, or other forms.

The modules described as separate parts may or may not be physically separate, and parts displayed as modules may or may not be physical units, may be located in one position, or may be distributed on a plurality of network units. Some or all the modules may be selected according to actual needs to achieve the objectives of the solutions of the embodiments.

In addition, functional modules in the embodiments of this application may be integrated into one processing unit, or each of the modules may exist alone physically, or two or more modules are integrated into one unit. The modular unit may be implemented in a form of hardware, or may be implemented in a form of hardware in addition to a software functional unit.

When the foregoing integrated module is implemented in a form of a software functional module, the integrated unit may be stored in a computer-readable storage medium. The software function module is stored in a storage medium and includes several instructions for instructing a computer device (which may be a personal computer, a server, or a network device) or a processor to perform some of the steps of the methods described in the embodiments of this application.

It should be understood that the processor may be a central processing unit (CPU), or may be another general purpose processor, a digital signal processor (DSP), an application-specific integrated circuit (ASIC), or the like. The general purpose processor may be a microprocessor, or the processor may be any conventional processor or the like. The steps of the methods disclosed with reference to this application may be directly implemented by a hardware processor, or may be implemented by a combination of hardware and a software module in a processor.

The memory may include a high-speed RAM memory, or may further include a non-volatile memory NVM, for example, at least one magnetic disk memory, or may be a USB flash drive, a removable hard disk, a read-only memory, a magnetic disk, an optical disc, or the like.

The bus may be an industry standard architecture (ISA) bus, a peripheral component interconnect (PCI) bus, an extended industry standard architecture (EISA) bus, or the like. The bus may be classified into an address bus, a data bus, a control bus, and the like. For ease of representation, the bus in the accompanying drawings of this application is not limited to only one bus or only one type of bus.

The storage medium may be implemented by any type of volatile or non-volatile storage device or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disc. The storage medium may be any available medium accessible to a general-purpose or dedicated computer.

For example, a storage medium is coupled to a processor, so that the processor can read information from the storage medium or write information into the storage medium. Certainly, the storage medium may be a component of the processor. The processor and the storage medium may be located in an application-specific integrated circuit (ASIC). Certainly, the processor and the storage medium may alternatively exist in an electronic device or a controlling device as discrete components.

What is claimed is:
1. A method, comprising:
obtaining, by a first device, a coding scheme indication, wherein the coding scheme indication indicates a coding scheme of data,
wherein the data is sent by the first device to a second device or received by the first device from the second device, and
wherein the coding scheme of the data is a polar coding scheme or a low-density parity-check (LDPC) coding scheme; and
sending, by the first device, the coding scheme indication including a pilot sequence associated with the coding scheme to the second device.

2. The method according to claim 1, wherein the pilot sequence comprises a first pilot sequence, and wherein the obtaining the coding scheme indication comprises:
obtaining, by the first device based on a mapping relationship between a first pilot sequence group and the coding scheme of the data, the first pilot sequence corresponding to the coding scheme of the data, wherein the first pilot sequence belongs to the first pilot sequence group, and the first pilot sequence group indicates the coding scheme of the data.

3. The method according to claim 1, wherein the pilot sequence comprises a second pilot sequence, and wherein obtaining, by the first device, the coding scheme indication comprises:
obtaining, by the first device based on a mapping relationship between a physical resource location to which the second pilot sequence is mapped and the coding scheme of the data, the physical resource location to which the second pilot sequence is mapped, wherein the second pilot sequence corresponds to the coding scheme of the data, and the physical resource location to which the second pilot sequence is mapped indicates the coding scheme of the data; and
wherein the sending the coding scheme indication to the second device comprises:
sending, by the first device, the second pilot sequence to the second device on a physical resource corresponding to the physical resource location to which the second pilot sequence is mapped.

4. The method according to claim 3,
wherein when the physical resource location to which the second pilot sequence is mapped is an even-numbered bit in frequency domain, the coding scheme indication indicates the LDPC coding scheme, and when the physical resource location to which the second pilot sequence is mapped is an odd-numbered bit in the frequency domain, the coding scheme indication indicates the polar coding scheme, or
wherein when the physical resource location to which the second pilot sequence is mapped is an even-numbered bit in the frequency domain, the coding scheme indication indicates the polar coding scheme, and when the physical resource location to which the second pilot sequence is mapped is an odd-numbered bit in the frequency domain, the coding scheme indication indicates the LDPC coding scheme.

5. The method according to claim 1, wherein the obtaining the coding scheme indication comprises:
obtaining, by the first device, a first index, wherein there is a mapping relationship between the first index and the coding scheme of the data,
wherein the sending the coding scheme indication to the second device comprises:
sending, by the first device, the first index to the second device.

6. The method according to claim 1, wherein the method further comprises:
before the obtaining the coding scheme indication:
determining, by the first device, the coding scheme of the data based on channel quality, a service type of the data, or a capability of the first device.

7. The method according to claim 1, wherein obtaining, by the first device, the coding scheme indication comprises:
generating, by the first device, information, wherein the information indicates the coding scheme of the data,
wherein sending, by the first device, the coding scheme indication to the second device comprises:
sending, by the first device, the information to the second device.

8. The method according to claim 7,
wherein the information comprises a first channel configuration field; and
wherein a coding scheme type field in the first channel configuration field indicates the coding scheme of the data.

9. The method according to claim 7, wherein when the information is usable to schedule the data, a coding scheme type field in the information indicates the coding scheme of the data.

10. The method according to claim 7, wherein generating, by the first device, the information comprises:
obtaining, by the first device, a second index, wherein there is a mapping relationship between the second index and a coding scheme; and
generating, by the first device, the information based on the second index, wherein the information comprises the second index, and the second index indicates the coding scheme of the data; and
wherein:
when the information is used to schedule the data, the second index in the information is used to indicate the coding scheme of the data.

11. The method according to claim 7, wherein before generating, by the first device, the information, the method further comprises:
receiving, by the first device, a third index sent by the second device, and obtaining, based on a mapping relationship between the third index and the coding scheme of the data, the coding scheme of the data that is indicated by the third index; and
wherein the obtaining the coding scheme indication comprises:
when the coding scheme of the data that is indicated by the third index is consistent with the coding scheme of the data that is determined by the first device, generating, by the first device, the coding scheme indication based on the coding scheme of the data that is indicated by the third index; or
when the coding scheme of the data that is indicated by the third index is inconsistent with the coding scheme of the data that is determined by the first device, generating, by the first device, the coding scheme indication based on the coding scheme of the data that is determined by the first device.

12. A first device, wherein the first device comprises:
at least one processor; and
a non-transitory computer-readable storage medium storing programming to be executed by the at least one processor, the programming including instructions to:
obtain a coding scheme indication,
wherein the coding scheme indication indicates a coding scheme of data, wherein the data is sent by the first device to a second device or received by the first device from the second device, and wherein the coding scheme of the data is a polar coding scheme or a low-density parity-check (LDPC) coding scheme; and send the coding scheme indication including a pilot sequence associated with the coding scheme to the second device.

13. The first device according to claim 12, wherein the pilot sequence comprises a first pilot sequence, and wherein the instructions to obtain the coding scheme indication include instructions to:

obtain, based on a mapping relationship between a first pilot sequence group and the coding scheme of the data, the first pilot sequence corresponding to the coding scheme of the data, wherein the first pilot sequence belongs to the first pilot sequence group, and the first pilot sequence group indicates the coding scheme of the data.

14. The first device according to claim 12, wherein the pilot sequence comprises a second pilot sequence, and wherein the instructions to obtain the coding scheme include instructions to:

obtain based on a mapping relationship between a physical resource location to which the second pilot sequence is mapped and the coding scheme of the data, the physical resource location to which the second pilot sequence is mapped, wherein the physical resource location to which the second pilot sequence is mapped indicates the coding scheme of the data; and wherein the instructions to send the coding scheme indication include instructions to:

send the second pilot sequence to the second device on a physical resource corresponding to the physical resource location to which the second pilot sequence is mapped.

15. The first device according to claim 14, wherein when the physical resource location to which the second pilot sequence is mapped is an even-numbered bit in frequency domain, the coding scheme indication indicates the LDPC coding scheme, and when the physical resource location to which the second pilot sequence is mapped is an odd-numbered bit in the frequency domain, the coding scheme indication indicates the polar coding scheme, or wherein when the physical resource location to which the second pilot sequence is mapped is an even-numbered bit in the frequency domain, the coding scheme indication indicates the polar coding scheme, and when the physical resource location to which the second pilot sequence is mapped is an odd-numbered bit in the frequency domain, the coding scheme indication indicates the LDPC coding scheme.

16. The first device according to claim 12, wherein the instructions to obtain the coding scheme indication include instructions to:

obtain a first index, wherein there is a mapping relationship between the first index and the coding scheme of the data, and the first index indicates the coding scheme of the data, and wherein the instructions to send the coding scheme indication include instructions to:

send the first index to the second device.

17. The first device according to claim 12, wherein the programming further includes instructions to:

before obtaining the coding scheme indication:
determine the coding scheme of the data based on channel quality, a service type of the data, or a capability of the first device.

18. The first device according to claim 12, wherein the programming includes instructions to:

generate information, wherein the information indicates the coding scheme of the data, wherein the instructions to send the coding scheme indication include instructions to:

send the information to the second device.

19. The first device according to claim 18, wherein the information comprises a first channel configuration field and wherein a coding scheme type field in the first channel configuration field is indicates the coding scheme of the data.

20. The first device according to claim 18, wherein when the information is usable to schedule the data, a coding scheme type field in the information indicates the coding scheme of the data.

* * * * *